(12) United States Patent
Kurosawa et al.

(10) Patent No.: US 8,403,186 B2
(45) Date of Patent: Mar. 26, 2013

(54) COMPOSITE SPOUT AND INJECTION-FORMING APPARATUS FOR FORMING THE COMPOSITE SPOUT

(75) Inventors: Takahiro Kurosawa, Yokohama (JP); Kimio Takeuchi, Yokohama (JP); Katsumi Hashimoto, Hiratsuka (JP); Yuhei Yonekawa, Hiratsuka (JP); Osamu Ishii, Hiratsuka (JP); Hiroomi Matsutani, Hiratsuka (JP)

(73) Assignees: Japan Crown Cork Co., Ltd., Tokyo (JP); Toyo Seikan Kaisha, Ltd., Tokyo (JP)

(*) Notice: Subject to any disclaimer, the term of this patent is extended or adjusted under 35 U.S.C. 154(b) by 1238 days.

(21) Appl. No.: 12/281,689

(22) PCT Filed: Mar. 1, 2007

(86) PCT No.: PCT/JP2007/054497
§ 371 (c)(1),
(2), (4) Date: Sep. 4, 2008

(87) PCT Pub. No.: WO2007/102566
PCT Pub. Date: Sep. 13, 2007

(65) Prior Publication Data
US 2009/0008416 A1 Jan. 8, 2009

(30) Foreign Application Priority Data

Mar. 6, 2006 (JP) ................. 2006-059276
Mar. 6, 2006 (JP) ................. 2006-059278

(51) Int. Cl.
*B65D 5/72* (2006.01)
*B65D 35/00* (2006.01)
*B05B 1/00* (2006.01)
*F16L 9/14* (2006.01)

(52) U.S. Cl. .......... 222/566; 222/92; 222/564; 239/591; 138/148

(58) Field of Classification Search ................. 222/566, 222/572, 92, 96, 109, 108, 564; 239/591, 239/589; 138/113, 114, 148, 149
See application file for complete search history.

(56) References Cited

U.S. PATENT DOCUMENTS 2,481,857 A * 9/1949 Menheneott et al. .......... 222/92
(Continued)

FOREIGN PATENT DOCUMENTS

| EP | 1 700 794 A1 | 9/2006 |
| JP | 7-205193 A | 8/1995 |

(Continued)

*Primary Examiner* — Kevin P Shaver
*Assistant Examiner* — Stephanie E Williams
(74) *Attorney, Agent, or Firm* — Sughrue Mion, PLLC

(57) ABSTRACT

A composite spout obtained by injection forming a spout body in a state where a sleeve having a functional resin layer disposed as an intermediate layer is fitted as a core onto the core member of an injection-forming metal mold such that the inner peripheral surface only of the sleeve is substantially exposed on the inner peripheral surface of the spout body. A tilted surface is formed on the inner peripheral surface at one end of the spout body in at least a portion thereof in the circumferential direction, the tilted surface being tilted outward in the radial direction from a position in agreement with the inner peripheral edge at the one end of the sleeve or from the inside thereof in the radial direction facing the one end of the spout body.

10 Claims, 18 Drawing Sheets

U.S. PATENT DOCUMENTS

| | | | |
|---|---|---|---|
| 3,073,485 A * | 1/1963 | Schultz | 222/92 |
| 3,495,630 A * | 2/1970 | Hansen et al. | 138/149 |
| 4,830,234 A * | 5/1989 | Odet | 222/465.1 |
| 6,375,041 B1 * | 4/2002 | Klima et al. | 222/129 |
| 2005/0040181 A1 | 2/2005 | Kurosawa et al. | |
| 2006/0201967 A1 | 9/2006 | Romer | |

FOREIGN PATENT DOCUMENTS

| | | |
|---|---|---|
| JP | 2001-213455 A | 8/2001 |
| JP | 2006-001623 A | 1/2006 |
| JP | 2007-106498 A | 4/2007 |
| WO | 03-029094 A1 | 4/2003 |

* cited by examiner

VIEW FROM AN ARROW X

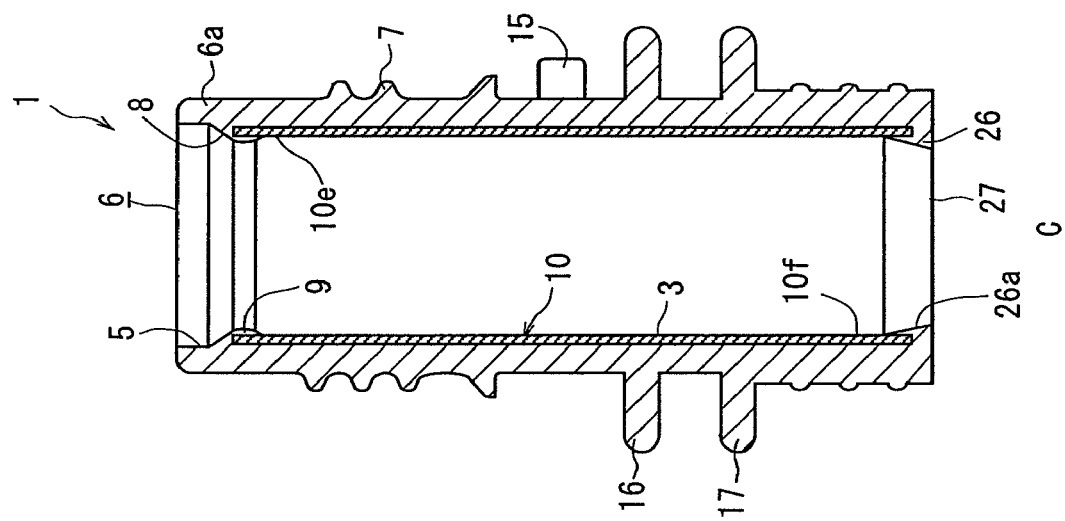
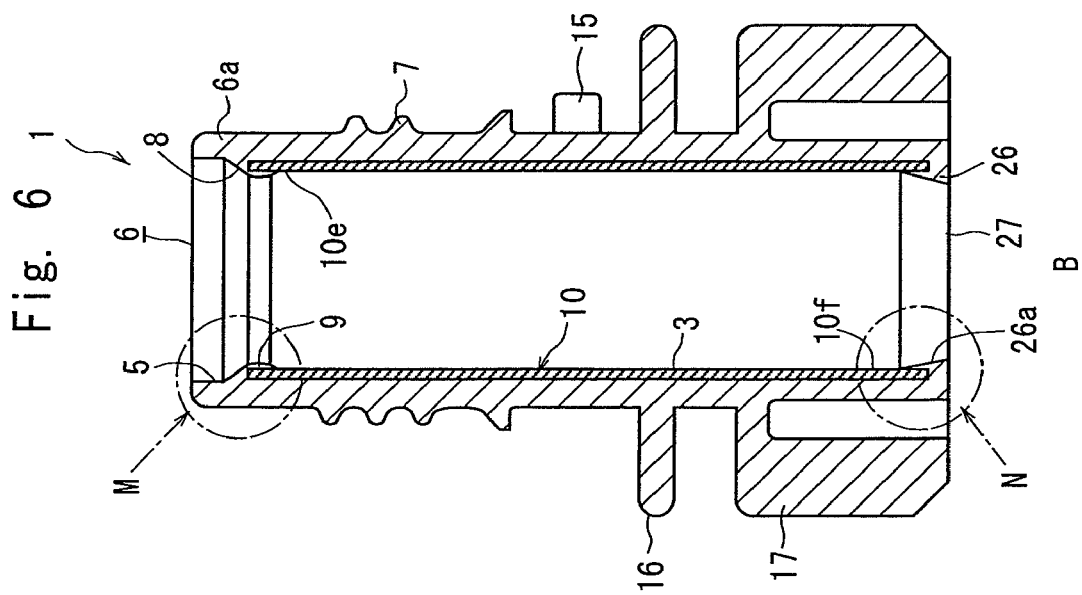
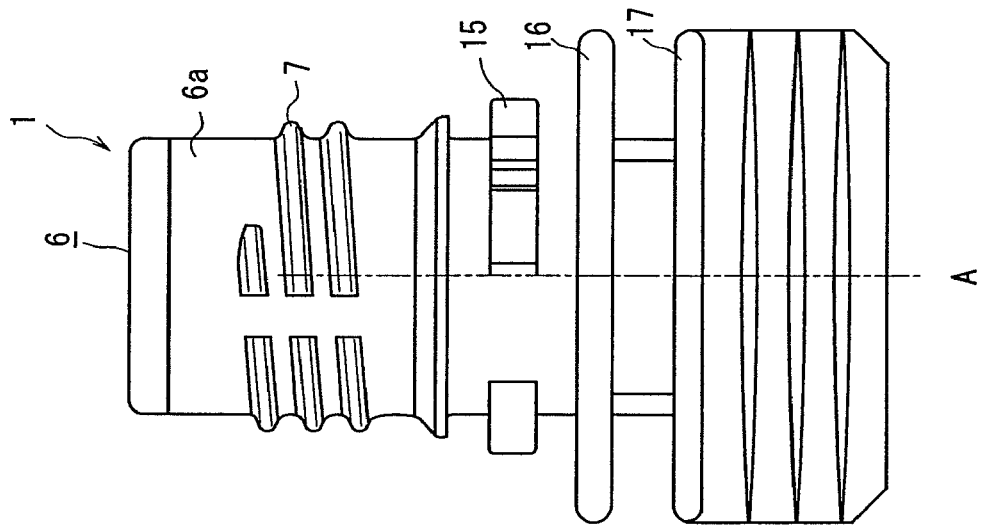
Fig. 6

Fig. 8
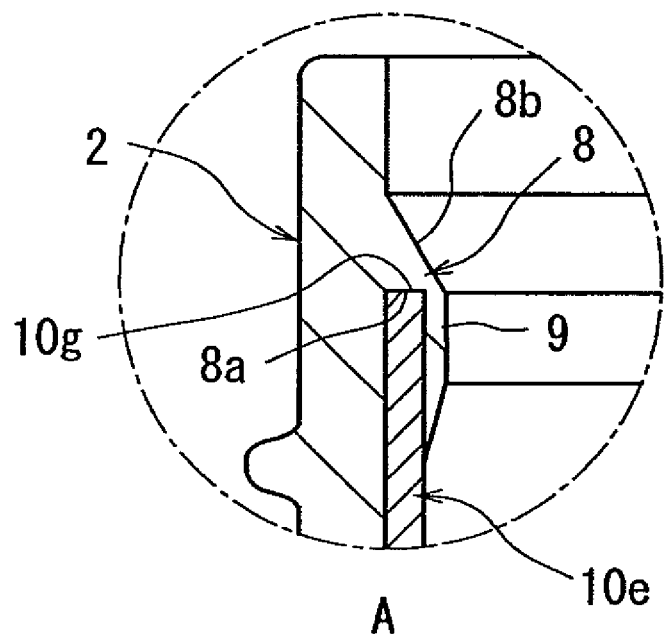
A
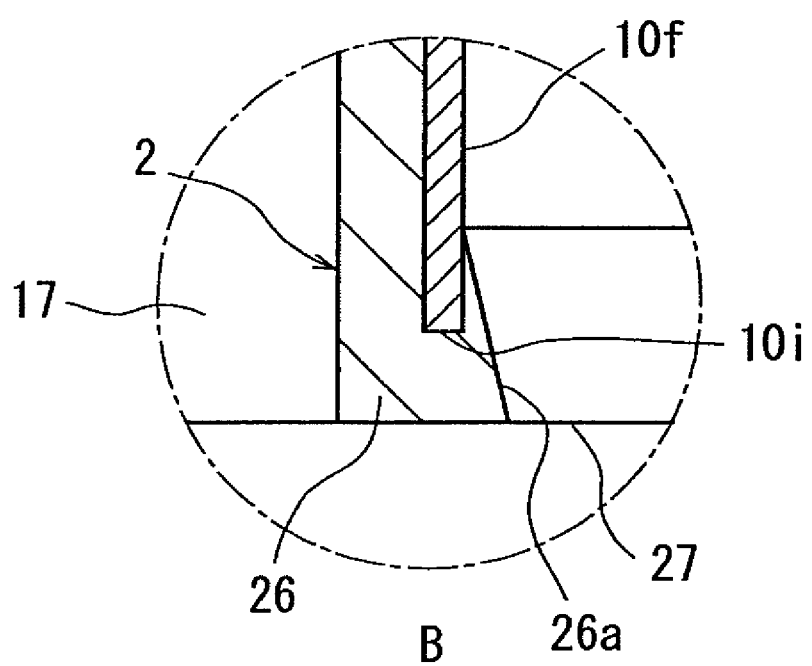
B

A-A SECTION

COMPOSITE SPOUT AND INJECTION-FORMING APPARATUS FOR FORMING THE COMPOSITE SPOUT

TECHNICAL FIELD

The present invention relates to a composite spout which, at the time of production, enables a sleeve including a functional resin layer to be fitted in a spout body without being deviated during the injection forming and without permitting end surfaces of the sleeve to be exposed in the air, and which, at the time of production, further, enables the sleeve fitted in the spout body to be easily set into a forming metal mold during the injection forming. The invention further relates to an injection-forming apparatus for forming the composite spout.

BACKGROUND ART

In recent years, containers such as pouches and paper containers with a spout have been known for containing highly functional foods and for pouring them out through a pouring fitting (hereinafter called spout) shown in FIGS. 14 and 15. To prevent the content from being degenerated with oxygen and to prevent a drop in the flavor retentivity, it is required that not only the container bodies such as pouches and paper containers but also the spouts must permit oxygen to pass through very little. For this purpose, therefore, a composite spout 1 has been proposed according to which a sleeve 10 which is a shielding member having excellent gas barrier property or excellently absorbing oxygen is fitted to the inner wall of the spout.

A sleeve 10 shown in FIG. 10 is fitted being insert-formed in the inside of a spout body 2 of a composite spout 1. The sleeve 10 has a multiplicity of layers, i.e., an inner layer 10b on the inside and an outer layer 10c on the outside with a functional resin layer 10a held between them. These layers are adhered together by interposing an adhesive layer 10d between the functional resin layer 10a and the inner layer 10b, and between the functional resin layer 10a and the outer layer 10c.

As the functional resin, there can be exemplified a gas-barrier material or an oxygen-absorbing material. The gas-barrier material may be represented by a resin such as an ethylene/vinyl alcohol copolymer. The oxygen-absorbing material may be either the one obtained by adding an oxygen absorber to the gas-barrier resin or the gas-barrier resin itself having a structure for absorbing oxygen. As the oxygen-absorbing material, there can be exemplified a polybutadiene and a polyisoprene which are oxidizing organic materials. As the material of the inner layer 10b and the outer layer 10c, there is used, for example, an olefin type resin which is a thermoplastic resin.

FIG. 17 illustrates a method of forming the composite spout 1 having the sleeve 10 by using an injection-forming apparatus.

Referring to FIG. 17A, the spout is formed by using a male mold 21 and a female mold 31, the male mold 21 having a core 22 of a cylindrical shape maintaining the same diameter from the proximal end thereof up to the distal end thereof, and the sleeve 10 being fitted onto the periphery of the core 22. The female mold 31 is of the split type that opens right and left, and its inner peripheral surface has a shape corresponding to the outer peripheral surface of the spout body shown in FIGS. 14 and 15.

Referring to FIG. 17C, a gate 33 is connected to the right female mold 31b to inject a molten resin from an injection-forming machine that is not shown.

In the above constitution, the core 22 of the male mold 21 is inserted in the female mold 31 to close the metal mold. Then, as shown in FIG. 17C, the molten resin is injected into a cavity 32 from the gate 33. The molten resin forms a portion that becomes the spout body 2 of the composite spout 1; i.e., the composite spout 1 is formed having the sleeve 10 on the inside of the spout body 2 (see JP-A-2001-213455).

When the core 22 has the same diameter in transverse cross section from the proximal end thereof up to the distal end thereof, however, the sleeve 10 is often deviated in the axial direction of the core 22 toward the proximal end side due to the dynamic pressure of the resin injected from the injection-forming machine as shown in FIG. 17D. If the sleeve 10 deviates up to the proximal end of the core 22 as described above, the end surfaces of the sleeve 10 are often exposed in the composite spout 1.

To cope with this problem, there has been proposed a method of producing the composite spout 1 as shown in FIG. 18.

Referring to FIG. 18A, there is no change in the female mold 31 but a stepped portion 29 is formed in the core 22 of the male mold 21 on the side of the proximal end (see a view from an arrow E in FIG. 18) which is nearly equal to the thickness of the sleeve 10 and is at right angles with the axial direction of the core 22, and the one end side of the sleeve 10 is brought into contact with the stepped portion 29. The portion where the stepped portion 29 is formed is brought into agreement with a position where the sleeve 10 is disposed in the composite spout 1.

In this constitution as shown in FIG. 18B, the core 22 of the male mold 21 is advanced toward the female mold 31 to close the male and female molds 21 and 31, and the molten resin is injected from the gate 33 as shown in FIG. 18C to thereby form the composite spout 1. When the molten resin is injected into the cavity 32 in the female mold 31, the stepped portion 29 limits the motion of the sleeve 10 in the axial direction of the core 22 despite the sleeve 10 receives the dynamic pressure of the molten resin.

However, if the motion of the sleeve 10 is limited by forming the stepped portion 29 in the core 22 of the male mold 21 as shown in FIG. 18A, the molten resin does not flow to an end surface 10g on the one end side of the sleeve 10, and the sleeve is fitted in a state of being exposed in an inner space of the composite spout 1 (see a view from an arrow F in FIG. 18). As a result, the end surface 10g of the sleeve 10 is exposed. When the content is filled, therefore, the functional resin elutes out from the functional resin layer 10a constituting the sleeve 10 arousing a problem from the standpoint of sanitation and causing a drop in the flavor of the content or a change of the content.

The present invention was accomplished in view of the above circumstances, and its first object is to provide a composite spout which does not permit a sleeve fitted onto the core to be deviated during the injection forming and does not permit end surfaces of the sleeve to be exposed in the spout body, and an injection-forming apparatus for forming the composite spout.

In forming the composite spout, further, no gap has been formed between the core 22 of the male mold 21 and the inner peripheral surface of the sleeve 10 as shown in FIG. 17A, and the sleeve 10 is exposed on the inner peripheral surface of the composite spout 1. Therefore, there remains a problem in that the sleeve 10 cannot be easily fitted onto the core 22.

Further, the resin does not flow up to both ends of the sleeve 10 of the composite spout 1 that is formed, and the ends of the sleeve 10 may exfoliate. Therefore, the end surface 10g of the sleeve 10 is exposed in the container, the gas-barrier member of the functional resin layer 10a is deteriorated, the oxygen absorber elutes out and, therefore, the functional resin fails to efficiently exhibit its action.

The present invention was accomplished in view of the above circumstances, and its second object is to provide a composite spout which enables a sleeve to be easily fitted onto the core of the male mold and is capable of reliably covering both ends of the sleeve, and an injection-forming apparatus for forming the composite spout.

Further, an end of a discharge port 6 of the composite spout 1 has a small thickness and a small capacity and, therefore, the molten resin is filled therein in only a small amount. Accordingly, the heat of the molten resin is not sufficiently conducted to the sleeve 10 and the sleeve 10 may be poorly melt-adhered to the spout body 2. As shown by a two-dot chain line 10h in FIG. 14 and as shown in FIG. 15, therefore, an end 10e of the sleeve 10 may exfoliate from the spout body 2. With the sleeve 10 being exfoliated, the content in the container may enter into between the spout body 2 and the sleeve 10. As the end surface 10g of the sleeve 10 is exposed in the container, further, the functional resin elutes out from the functional resin layer 10a. When the content is filled, therefore, a problem arouses concerning sanitation, and flavor retentivity of the content drops.

The present invention was accomplished in view of the above circumstances, and its third object is to provide a composite spout which enables a spout body and a sleeve to be reliably adhered together, and an injection-forming apparatus for forming the composite spout.

DISCLOSURE OF THE INVENTION

In order to achieve the above first object, the present invention provides a composite spout in which a cylindrical sleeve having a functional resin layer disposed as an intermediate layer is fitted onto the inner peripheral surface of a spout body in a manner that the inner peripheral surface only of the cylindrical sleeve is substantially exposed, wherein a tilted surface is formed on the inner peripheral surface at the one end of the spout body in at least a portion thereof in the circumferential direction, the tilted surface being tilted outward in the radial direction from a position in agreement with the inner peripheral edge at the one end of the cylindrical sleeve or from the inside thereof in the radial direction facing the one end of the spout body.

In the above composite spout, it is desired that the one end of the spout body is constituting a discharge end of the spout.

In the above composite spout, it is desired that the one end of the inner peripheral surface of the spout body is forming the tilted surface over the whole circumferential direction.

In the above composite spout, it is desired that the one end of the inner peripheral surface of the spout body is forming the tilted surfaces at a plurality of portions maintaining a distance in the circumferential direction.

In order to achieve the above object, the present invention provides an injection-forming apparatus comprising a core member onto which a cylindrical sleeve having a functional resin layer disposed as an intermediate layer is fitted as a core, and a female mold member surrounding the core member and the cylindrical sleeve fitted onto the core member, in order to form a composite spout in a state where the cylindrical sleeve is fitted onto the inner peripheral surface of the spout body in a manner that only the inner peripheral surface thereof is substantially exposed, wherein the core member has, in at least a portion thereof in the circumferential direction, a tilted surface which is extending outward in the radial direction from a position in agreement with the inner peripheral edge at the one end of the cylindrical sleeve fitted onto the core member or from the inside thereof in the radial direction facing the one end of the cavity for forming the spout body.

Here, the one end of the spout is not expressed as the one end side or the other end side of the spout. This is because the tilted surface may be formed on the one end side of the spout (see FIG. 3) or on the other end side of the spout (see FIG. 5).

In order to achieve the above second object, the present invention provides a composite spout obtained by injection-forming a spout body in a state where a cylindrical sleeve having a functional resin layer disposed as an intermediate layer is fitted as a core onto a core member of an injection-forming metal mold such that the inner peripheral surface only of the cylindrical sleeve is substantially exposed on the inner peripheral surface of the spout body, that an end of the sleeve is disposed at a distal end of the spout body and that the other end of the sleeve is disposed at the proximal end of the spout body, wherein an end of the inner peripheral surface of the spout body constituting the proximal end of the spout forms a tilted surface tilted inward in the radial direction facing an open end of the proximal end.

In the above composite spout, the one end side of the tilted surface covers the inner peripheral surface at the other end side of the cylindrical sleeve.

In the above composite spout, further, a tilted surface is formed on the inner peripheral surface of the spout body at the distal end of the spout body constituting the discharge end of the spout, the tilted surface being tilted outward in the radial direction from a position in agreement with the inner peripheral edge at the one end of the cylindrical sleeve or from the inside thereof in the radial direction facing distal end of the spout body.

In the above composite spout, further, a sealing region of a predetermined length is formed on the inner peripheral surface of the spout body at the distal end of the spout body constituting the discharge end of the spout, the sealing region extending from the distal end of the spout body up to just short of the one end of the cylindrical sleeve.

Further, the present invention provides an injection-forming apparatus comprising a protruded core member onto which a cylindrical sleeve having a functional resin layer disposed as an intermediate layer is fitted as a core, and a female mold member surrounding the core member onto which the cylindrical sleeve is fitted maintaining a gap, in order to form a composite spout in a state where the cylindrical sleeve is fitted onto the inner peripheral surface of the spout body in a manner that only the inner peripheral surface thereof is substantially exposed, wherein the distal end of the core member is forming a surface that smoothly becomes narrow inward in the radial direction from the side of the proximal end of the core member facing the side of the distal end thereof.

In the above injection-forming apparatus, the surface of the core member that becomes narrow toward the end extends from the inner peripheral surface on the other end side of the cylindrical sleeve up to a position protruding from the other end of the cylindrical sleeve.

In the above injection-forming apparatus, further, a recessed portion is formed in the proximal end of the core member so as to be dented inward in the radial direction below the inner peripheral surface of the cylindrical sleeve from the inner peripheral surface of the cylindrical sleeve up to a portion corresponding to the outer side of the cylindrical sleeve in the axial direction on the one end side of the cylindrical sleeve.

In order to achieve the above third object, the present invention provides a composite spout obtained by injection-forming a spout body in a state where a cylindrical sleeve having a functional resin layer disposed as an intermediate layer is fitted as a core onto a core member of an injection-forming metal mold such that the inner peripheral surface only of the cylindrical sleeve is substantially exposed on the inner peripheral surface of the spout body, wherein, at the distal end of the spout body constituting the discharge end of the spout, an additional portion is formed on the outer peripheral surface and/or on the inner peripheral surface of the spout body at a portion where the cylindrical sleeve is corresponding to the distal end side of the spout body, the additional portion protruding outward in the radial direction and/or protruding from the inner peripheral surface thereof.

In the above composite spout, the additional portion is present over the whole circumferential direction or is formed being divided into a plurality of portions maintaining a distance in the circumferential direction.

In the above composite spout, the additional portion on the inner peripheral surface side of the spout body can cover the inner peripheral surface of the cylindrical sleeve on the one end side thereof.

BRIEF DESCRIPTION OF THE DRAWINGS

FIG. 3 illustrates the forming steps by using the apparatus for injection-forming the composite spout of FIG. 1, wherein FIG. 3A is a sectional view illustrating a state where a sleeve is fitted onto the core of the male mold, FIG. 3B is a sectional view illustrating a state where the male mold and the female mold are closed together, FIG. 3C is a sectional view illustrating a state where a molten resin is filled in the metal mold from a gate, and FIG. 3D is a sectional view illustrating a state where the composite spout is taken out from the metal mold;

FIG. 5 shows the composite spout according to another modified example of the embodiment, wherein FIG. 5A is a sectional view illustrating a state where a sleeve is fitted onto the core of the male mold, FIG. and 3B is a sectional view illustrating a state where the composite spout is taken out from the metal mold;

FIG. 6 shows the composite spout according to a second embodiment of the invention, wherein FIG. 6A is a front view of the composite spout, FIG. 6B is a sectional view as seen from the front, and FIG. 6C is a sectional view as seen from the side;

FIG. 8A is a sectional view on an enlarged scale of a portion of FIG. 6B in a circle as viewed from an arrow M, and FIG. 8B is a sectional view on an enlarged scale of a portion of FIG. 6B in a circle as viewed from an arrow N;

FIG. 10 illustrates the forming steps by using the apparatus for injection-forming the composite spout of FIG. 6, wherein FIG. 6A is a sectional view illustrating a state where a sleeve is fitted onto the core of the male mold, FIG. 6B is a sectional view illustrating a state where the male mold and the female mold are closed together, FIG. 6C is a sectional view illustrating a state where a molten resin is filled in the metal mold from a gate, and FIG. 6D is a sectional view illustrating a state where the composite spout is taken out from the metal mold;

FIG. 17 illustrates the forming steps by using the apparatus for injection-forming the conventional composite spout, wherein FIG. 17A is a sectional view illustrating a state where a sleeve is fitted onto the core of the male mold, FIG. 17B is a sectional view illustrating a state where the male mold and the female mold are closed together, FIG. 17C is a sectional view illustrating a state where a molten resin is filled in the metal mold from a gate, and FIG. 17D is a sectional view illustrating a state where the composite spout is deviated in the axial direction of the core; and FIG. 18 illustrates the forming steps by using the apparatus for injection-forming another conventional composite spout, wherein FIG. 18A is a sectional view illustrating a state where a sleeve is fitted onto the core of the male mold, FIG. 18B is a sectional view illustrating a state where the male mold and the female mold are closed together, FIG. 18C is a sectional view illustrating a state where a molten resin is filled in the metal mold from a gate, and FIG. 18D is a sectional view illustrating a state where the composite spout is deviated in the axial direction of the core.

BEST MODE FOR CARRYING OUT THE INVENTION

Described below with reference to the drawings are a composite spout and an apparatus for injection-forming the composite spout according to a first embodiment of the present invention.

Figure 16:
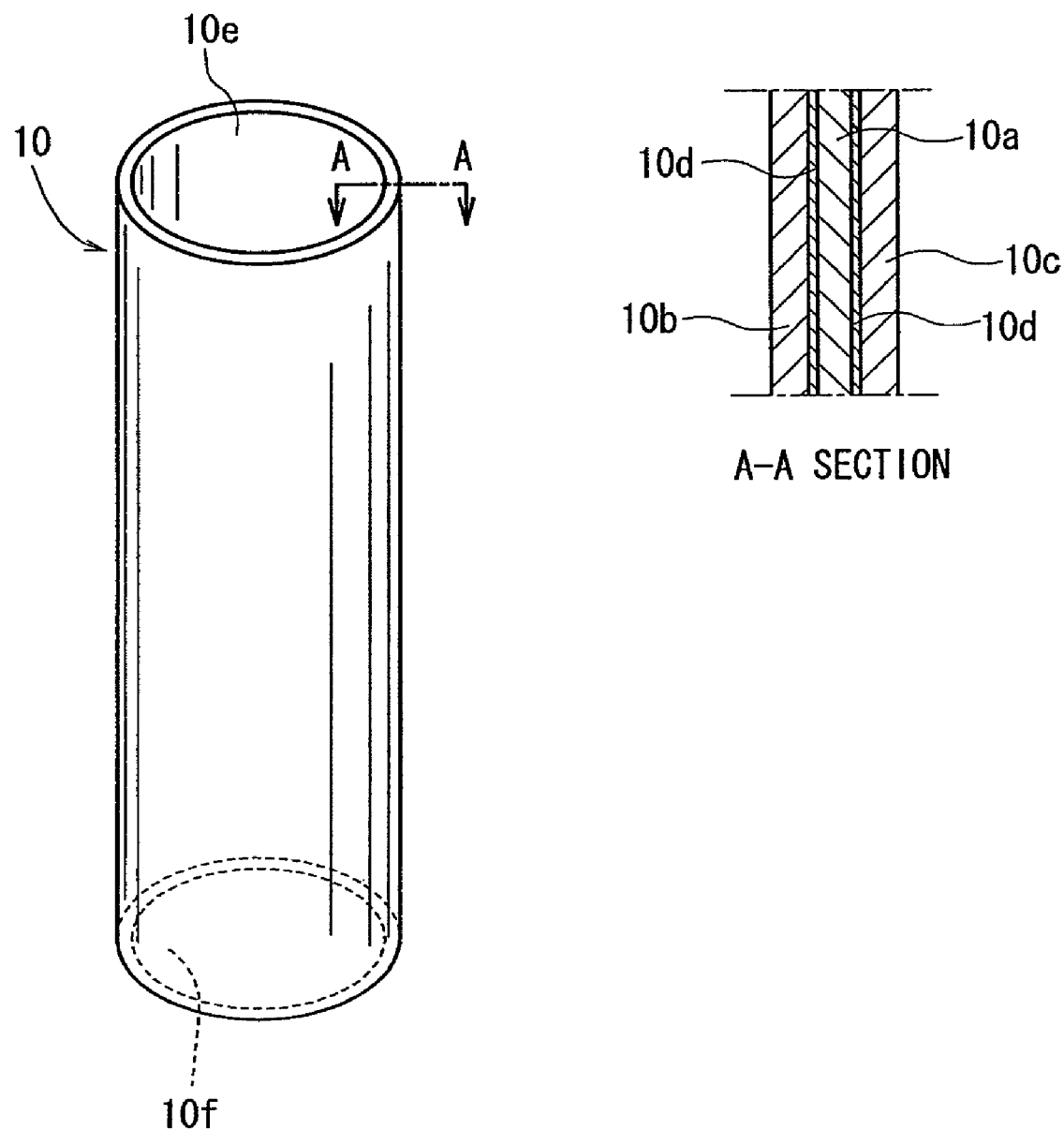
FIG. 16 is a perspective view of a sleeve in the composite spout according to the present invention and according to a prior art.
Figure 17:
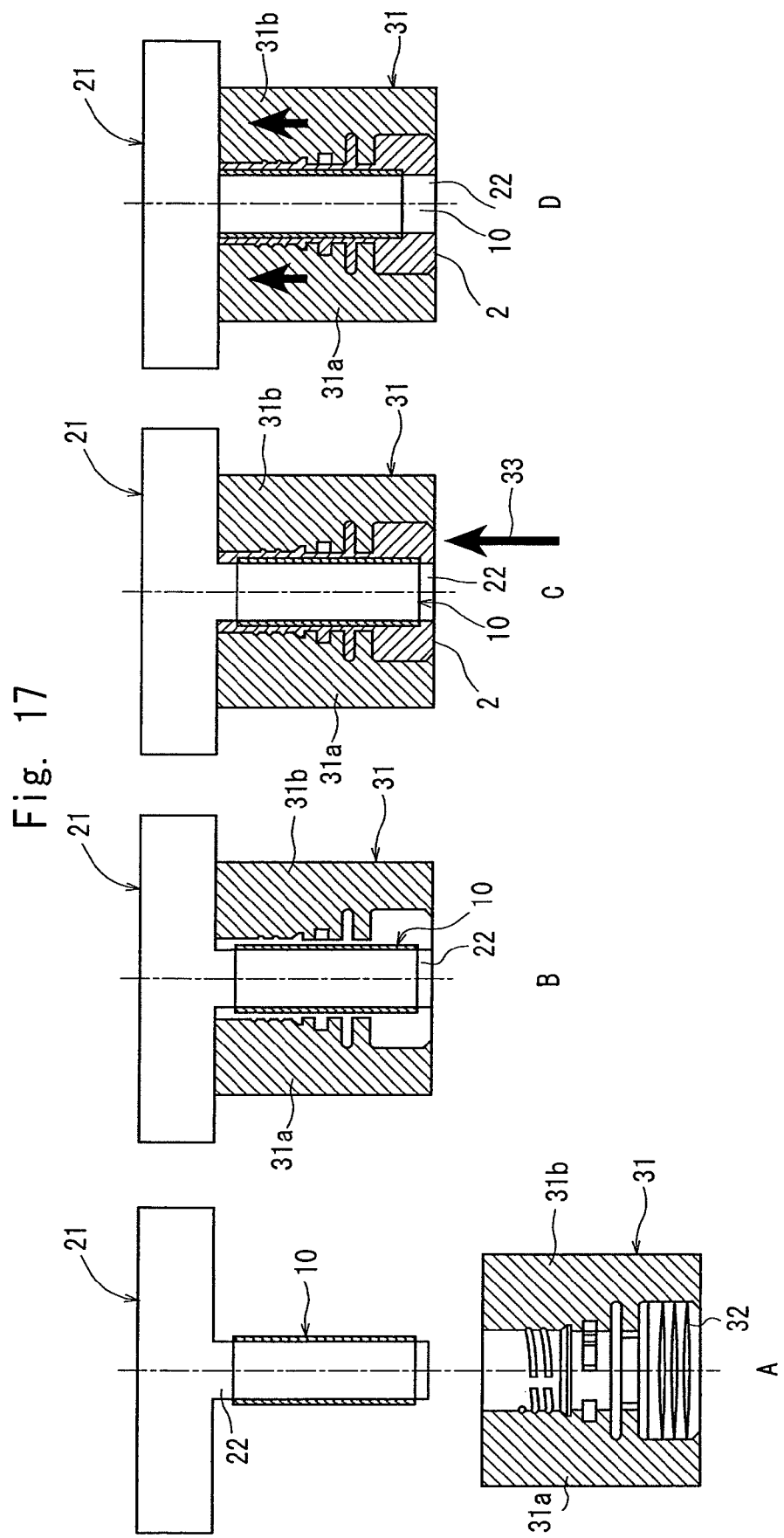
Figure 18:
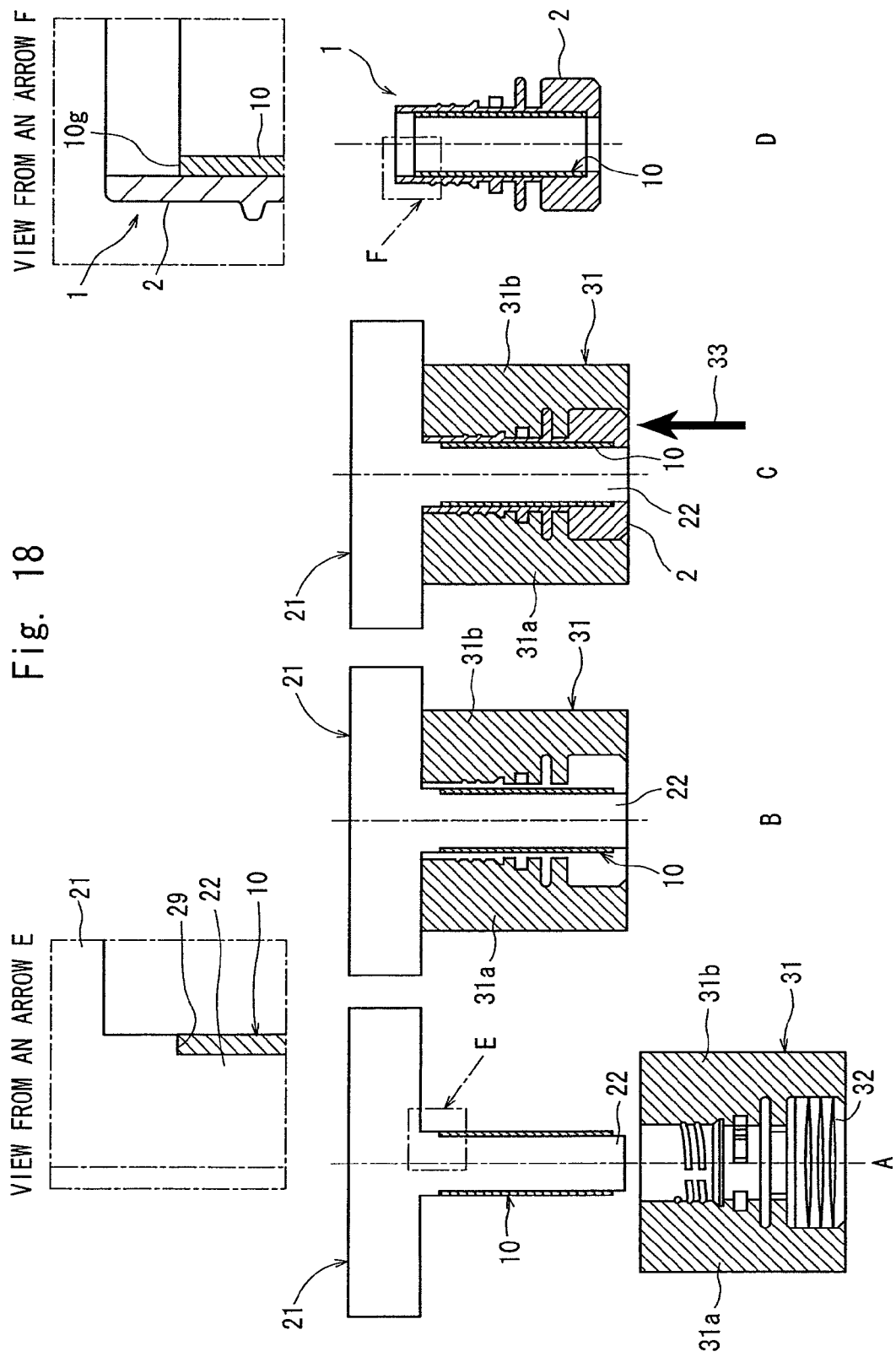

The sleeve 10 described above in the prior art is a multi-layer sleeve 10 comprising five layers including an adhesive layer, and has the same structure as the sleeve 10 of this embodiment as shown in FIG. 16, and is not described here again in detail. The composite spout 1 has a discharge port on the side of the distal end and has a mounting portion 17 on the side of the proximal end. The sleeve 10 has the one end 10e on the side of the discharge port 6 of the composite spout 1 and has the other end 10f on the side of the mounting portion. The shape of the sleeve 10 and the direction of the composite spout also apply to the following second embodiment and third embodiment.

Figure 1:
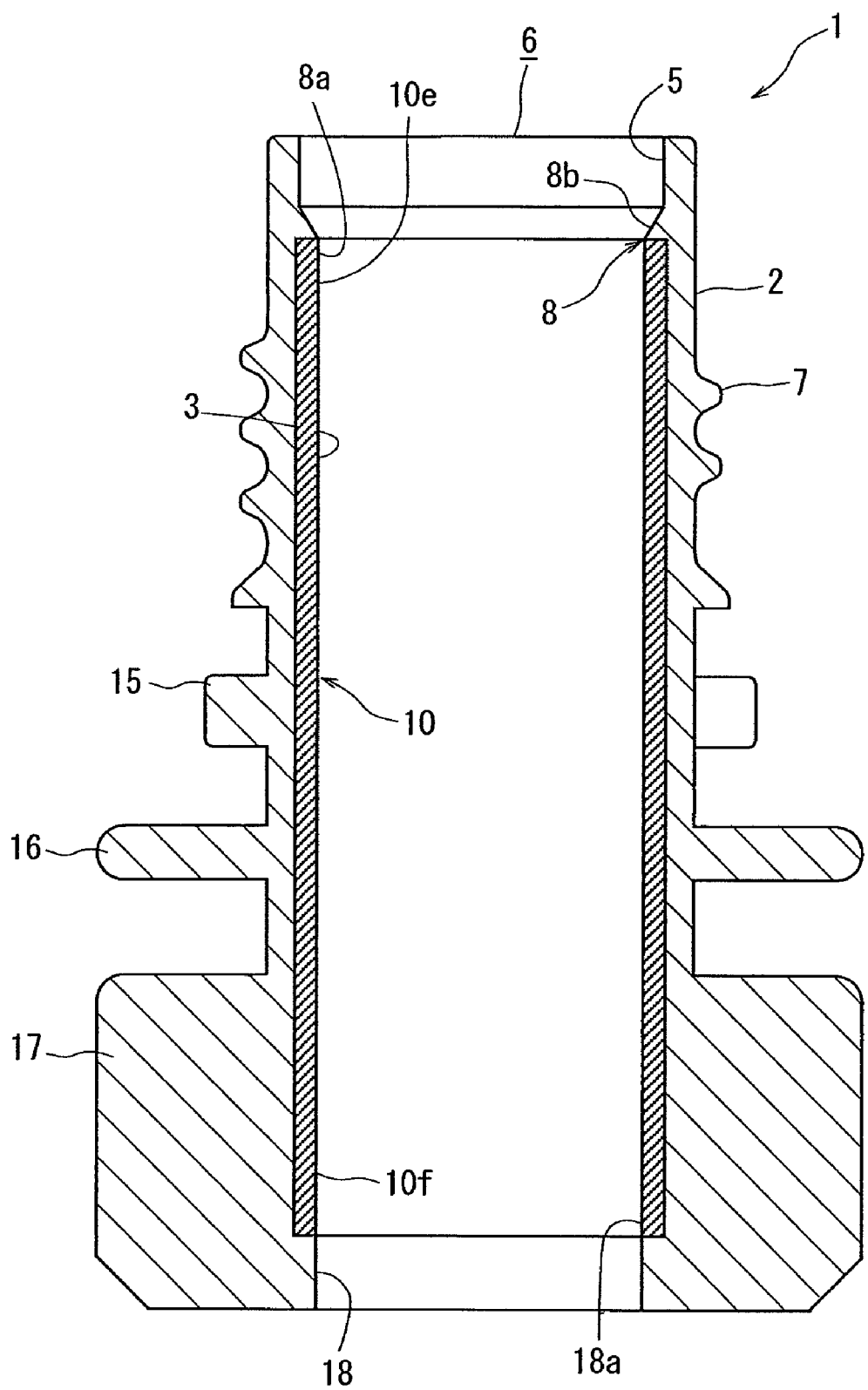
FIG. 1 is a sectional view of a composite spout according to a first embodiment of the present invention.

FIG. 1 is a sectional view of a composite spout 1 according to the present invention. As shown, the composite spout 1 is constituted by a spout body 2 and a sleeve 10 fitted onto the inner peripheral surface thereof. The content flows in or out on the inner peripheral surface side of the spout body 2, and a conduit 3 of nearly a cylindrical shape is formed by the spout body 2 and by the sleeve 10. An inner peripheral seal surface 5 is formed at an upper part of the conduit 3 on the inner peripheral surface side thereof, so that a seal portion of a sealing cap that is not shown will come in contact therewith, and the discharge port 6 is formed in the upper end portion thereof.

An external thread 7 is nearly helically formed on the outer peripheral surface side of the spout body 2 so as to be screwed into the female thread of the sealing cap on the side of the discharge port 6. Under the male thread 7, there are formed an engaging portion 15 for engagement with a tamper-evidence band of the sealing cap and a flange 16 maintaining a distance from the engaging portion 15. The flange 16 plays a functional role such as grip and support at the time of conveying the composite spout 1. The mounting portion 17 for mounting the pouch is formed at the lower part of the second flange 16, and the mounting portion 17 maintains sealing in the connection portion between the pouch and the composite spout 1.

The sleeve 10 is fitted in the inner hole of the spout body 2. The sleeve 10 has the same thickness from the one end 10e through up to the other end 10f in the axial direction, and the outer peripheral surface of the sleeve 10 is melt-adhered onto the inner peripheral surface of the spout body 2. A protuberance 8 having a triangular shape in cross section and protruding toward the center of the conduit 3 is annularly formed in the circumferential direction of the conduit 3 at the one end 10e of the sleeve 10 positioned on the side of the discharge port 6 of the spout body 2.

The protuberance 8 forms a limiting surface 8a that intersects the axial direction of the conduit (and sleeve 10) 3 at right angles and a tilted surface (circular truncated conical surface or tapered surface) 8b facing the side of the discharge port 6, i.e., the tilted surface 8b expanding toward the side of the discharge port 6. The limiting surface 8a and the surface at the one end of the sleeve 10 are melt-adhered together, and the height of the limiting surface 8a relative to the conduit 3 in the radial direction is equal to the thickness of the sleeve 10. Here, the height of the limiting surface 8a does not have to be selected to be equal to the thickness of the sleeve 10 but is desired to be selected to be equal thereto from the standpoint of formability and besides at least the functional resin layer 10a which is an intermediate layer of the sleeve 10 shown in FIG. 5 must be covered with the limiting surface 8a.

A small-diameter portion 18 is formed in the composite spout 1 at the other end 10f of the sleeve 10 so as to protrude inward of the conduit 3 like a step from the junction surface of the conduit 3 and the sleeve 10, and a holding surface 18a is formed in the boundary portion between the small-diameter portion 18 and the sleeve 10 intersecting the axial direction of the conduit 3 at right angles. Though the height of the holding surface 18a in the radial direction of the conduit 3 is selected to be equal to the thickness of the sleeve 10, the functional resin layer 10a of the sleeve 10 shown in FIG. 16 must at least be covered with the holding surface 18a. Thus, the sleeve 10 is fitted in the inner peripheral surface of the spout body 2 without permitting the functional resin layer 10a of the sleeve 10 to be exposed in the inner space of the conduit 3.

As the resin for constituting the spout body 2, there can be used olefin resins which are the thermoplastic resins of polyethylenes (PE), such as low-density polyethylene (LDPE), medium-density polyethylene (MDPE), high-density polyethylene (HLDE), linear low-density polyethylene (LLDPE), and linear very-low-density polyethylene (LVLDPE), as well as polypropylene (PP), ethylene/propylene copolymer, polybutene-1, ethylene/butene-1 copolymer, propylene/butene-1 copolymer, ethylene/propylene/butene-1 copolymer, propylene/butene-1 copolymer, ethylene/propylene/butene-1 copolymer, ethylene/vinyl acetate copolymer (EVA), ionically crosslinked olefin copolymer (ionomer) or blends thereof. It is also allowable to use thermoplastic polyester resins, in general, like polyesters such as ethylene terephthalate type thermoplastic polyester (PET), polybutylene terephthalate (PBT) and polyethylene naphthalate (PEN), or blends thereof with a polycarbonate or a polyarylate. The resins constituting the spout body 2 can be used in the following second embodiment and third embodiment, too.

As the functional resin layer 10a in the sleeve 10, there can be used a resin having a predetermined function, such as a gas-barrier resin, an oxygen-absorbing resin or a water-shielding resin depending upon the use. As the gas-barrier resin, there can be preferably used an ethylene/vinyl alcohol copolymer which is an oxygen-barrier layer containing vinyl alcohol units in an amount of 40 to 85 mol % and, particularly, 55 to 80 mol %, and having a saponification degree of not less than 96 mol % and, particularly, not less than 99 mol %. As other oxygen-barrier resins, there can be used nylon resins and, particularly, aliphatic nylons such as nylon 6, nylon 8, nylon 11, nylon 6,6, nylon 6,10, nylon 10,6, and nylon 6/6,6 copolymer, partly aromatic nylon such as polymetaxylylene adipamide, as well as polyglycolic acid resin. From the standpoint of preserving the content and retaining flavor, the oxygen-barrier property is desirably such that the oxygen permeation coefficient is not larger than $5.5 \times 10^{-12}$ cc·cm/cm$^2$·sec·cmHg (23° C., 0% RH). The resins constituting the functional resin layer 10a in the sleeve 10 can be used in the following second embodiment and third embodiment, too.

When the functional resin layer 10a is to be used as the oxygen-absorbing resin layer, on the other hand, the above gas-barrier resin layer may be imparted with oxygen-absorbing property or the resin of the gas-barrier resin layer may be the one having oxygen-absorbing property. The above resin may be, for example, the one that utilizes the oxidation reaction, e.g., oxidizing materials of polyamides such as polybutadiene, polyisoprene, polypropylene, ethylene/carbon oxide polymer, nylon-6, nylon-12, metaxylylene diamine (MX) nylon to which are added organic acid salts containing a transition metal such as cobalt, rhodium or copper as an oxidizing catalyst and a photosensitizer such as benzophene, acetophene or chloroketones. Use of these oxygen-absorbing materials exhibits a further improved effect when irradiated with a ray of high energy, such as an ultraviolet ray or an electron ray. The oxygen-absorbing resin layer can be used as the functional resin layer 10a in the following second embodiment and third embodiment, too.

Further, an oxidizing organic component may be contained in the resin of the gas-barrier resin layer so as to attain oxygen-absorbing property without decreasing the gas-barrier property that results from the oxidation and deterioration of the gas-barrier resin layer. As the oxidizing organic component, it is desired to use a polyene polymer derived from a polyene, and into which a carboxylic acid group, a carboxylic anhydride group or a hydroxyl group has been introduced. As the functional groups, there can be exemplified acrylic acid, methacrylic acid, maleic acid, unsaturated carboxylic acid, anhydrous maleic acid and unsaturated carboxylic anhydride. As the transition metal catalyst, cobalt is preferred. The gas-barrier resin layer can contain the oxidizing organic component in the following second embodiment and third embodiment, too.

The resin constituting the gas-barrier resin layer may be blended with the oxygen absorber. As the oxygen absorber, there can be used metal powders having reducing property, such as reducing iron powder, reducing zinc, reducing tin powder, metallic low level oxide and reducing metal compound which may be used in one kind or in two or more kinds in combination. As required, they may be used in combination with an assistant such as alkali metal, hydroxide of an alkaline earth metal, carbonate, sulfite, organic acid salt, halogen compound, active carbon or active alumina. Or, there may be used a high molecular compound having a polyhydric phenol in the skeleton, such as polyhydric phenol-containing phenol-aldehyde resin. The resin constituting the gas-barrier resin layer may be blended with the oxygen absorber in the following second embodiment and third embodiment, too.

When the water-shielding resin layer is used as the functional resin layer 10a, there can be used a cyclic olefin copolymer or an amorphous or lowly crystalline copolymer (COC) of olefin and cyclic olefin as the water-shielding resin. The gas-barrier resin and the oxygen-absorbing resin may be blended with filler, coloring agent, heat stabilizer, weatherproofing agent, antioxidant, anti-aging agent, photo stabilizer, ultraviolet ray absorber, antistatic agent, lubricant such as metal soap or wax, and reforming agent. The water-shielding resin layer can be used as the functional resin layer 10a in the following second embodiment and third embodiment, too.

As the materials of the inner layer 10b and the outer layer 10c forming the sleeve 10, there can be used an olefin resin which is the same thermoplastic resin as that of the spout body 2. From the standpoint of heat-melt adhesion between the sleeve 10 and the spout body 2, it is desired that at least the inner layer 10b is formed by using the olefin resin having a melting point lower than that of the olefin resin forming the spout body 2. The materials of the inner layer 10b and the outer layer 10c forming the sleeve 10 can be used in the following second embodiment and third embodiment, too.

Next, described below is an injection-forming metal mold for forming the composite spout 1.

Figure 2:
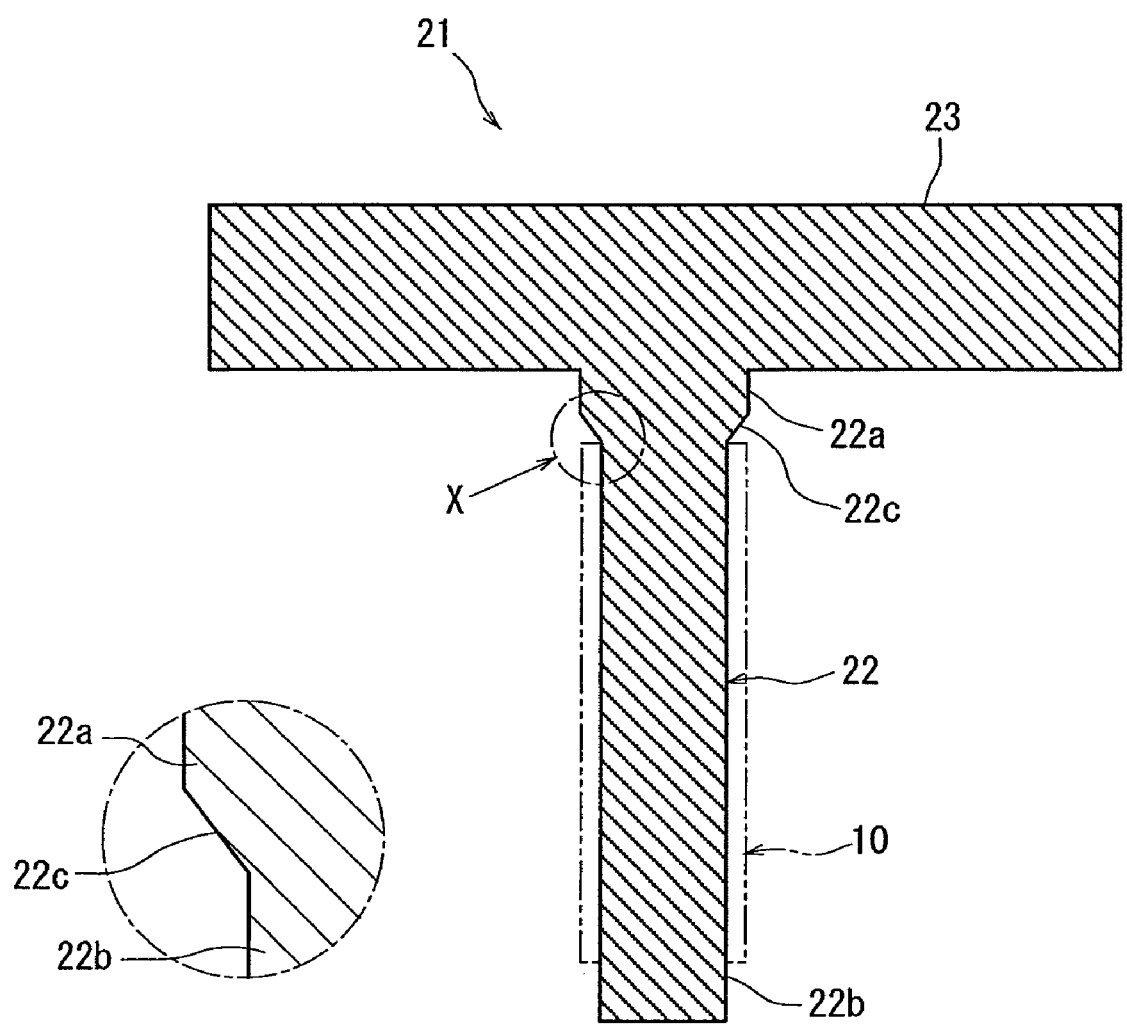
FIG. 2 is a sectional view of a male mold in an injection-forming apparatus for forming the composite spout of FIG. 1.

FIG. 2 shows a male mold 21 in the injection-forming metal mold. A base plate 23 of the male mold 21 is forming a core 22 of a cylindrical shape so as to protrude in a direction at right angles with the surface of the base plate 23. The core 22 has a proximal end on the side of the base plate 23, and has a distal end on the side of its free end (this also holds in the following second and third embodiments, too).

The core 22 is constituted by a large-diameter portion 22a positioned at the proximal end on the side of the base plate 23, a small-diameter portion 22b positioned on the distal end side of the core 22 and a titled surface 22c of a circular truncated conical shape formed between the large-diameter portion 22a and the small-diameter portion 22b. The tilted surface 22c is so tilted as to extend inward in the radial direction facing the distal end side of the core 22.

In this embodiment, the height of the tilted surface 22c in the radial direction of the core 22 is equal to the thickness of the sleeve 10, the outer diameter of the large-diameter portion 22a is equal to the outer diameter of the sleeve 10, and the outer diameter of the small-diameter portion 22b is equal to the inner diameter of the sleeve 10. Here, the tilted surface 22c may be present at a position on an extension of the inner peripheral surface of the sleeve 10 in the axial direction of the sleeve.

The length of the small-diameter portion 22b of the core 22 in the axial direction is greater than the length of the sleeve 10 in the axial direction.

Referring to FIG. 3A, the female mold 31 is formed by a left female mold 31a and a right female mold 31b so as to be split toward the right and left. A cavity 32 is formed in the right-left female mold 31, and the shape of the inner peripheral surface of the female mold 31 is the same as the outer peripheral shape of the spout body 2. The right female mold 31b is provided with a gate 33 (FIG. 3C) which faces the cavity 32 and is communicated with the injection port of the injection-forming machine that is not shown. The male mold 21 is so constituted as to move back and forth, so that the core 22 can be inserted in the cavity 32 of the female mold 31 and pulled out therefrom in the up-and-down direction.

Next, described below are the steps of forming the composite spout 1.

The composite spout 1 is formed by using the injection-forming apparatus having the injection-forming machine and the forming metal mold.

Referring to FIG. 2, the sleeve 10 is fitted onto the core 22 of the male mold 21 until one end 10e of the sleeve 10 comes in contact with the bottom of the tilted surface 22c. Therefore, the tilted surface 22c plays the role of positioning the sleeve 10. With the sleeve 10 being fitted onto the core 22 as shown in FIG. 3A, the core 22 is inserted in the cavity 32 of the female mold 31, and the male mold and the female mold 21, 31 are closed together as shown in FIG. 3B.

Referring next to FIG. 3C, the resin stirred and melted in the injection-forming machine is injected into the cavity 32 through the gate 33. Upon receiving the dynamic pressure of the molten resin, the sleeve 10 is urged to move toward the large-diameter portion 22a on the proximal end side of the core 22 but is limited from moving due to the tilted surface 22c of the core 22. Therefore, the sleeve 10 must have a hardness to such an extent as will not expand in the radial direction and as will not move rising on the tilted surface 22c. The tilted surface 22c is for limiting the position of the sleeve 10; i.e., the tilted surface 22c must be so formed on the core 22 that the sleeve 10 is disposed at a normal position in the spout body 2.

The injection-forming machine fills the molten resin between the female mold 31 and the core 22 of the male mold 21 to form the spout body 2. A gap of a triangular shape is formed between the one end of the sleeve 10 and the tilted surface 22c formed on the core 22, and the molten resin is filled in the gap to form the protuberance 8 of the spout body 2. A portion of the protuberance 8 that comes in contact with an end surface of the one end 10e of the sleeve 10, serves as a limiting surface 8a, while a surface of the protuberance 8 that comes in contact with the tilted surface 22c of the core 22 serves as a tilted surface 8b (FIG. 3, view from an arrow Y and view from an arrow Z). At the other end 10f of the sleeve 10, the end surface is covered with the molten resin to form a holding surface 18a. Thus, the end surfaces at the one end 10e and the other end 10f of the sleeve 10 are covered with the spout body 2. When being formed, the spout body 2 comes in contact with the sleeve 10 in the molten state improving close contact and adhesive property between the spout body 2 and the sleeve 10.

The composite spout 1 is formed as the molten resin is cooled and solidified. After the spout body 2 is solidified, the composite spout 1 is taken out by opening the female mold 31. The sleeve 10 has no gap between the sleeve 10 and the small-diameter portion 22b of the core 22, and no molten resin enters into between them; i.e., the outer peripheral surface of the sleeve 10 comes in contact with the inner peripheral surface of the composite spout 1.

According to this embodiment as described above, at the time of injection forming, the sleeve 10 is not caused by the dynamic pressure of the molten resin to move in the axial direction of the core 22 and, after the spout body 2 is formed, the composite spout 1 is obtained without exposing the surfaces of the sleeve 10 at both ends thereof. After the composite spout 1 is completed, therefore, no functional resin elutes out from the functional resin layer 10a of the sleeve 10.

Next, described below is a modified example of the composite spout of the first embodiment.

Figure 3:
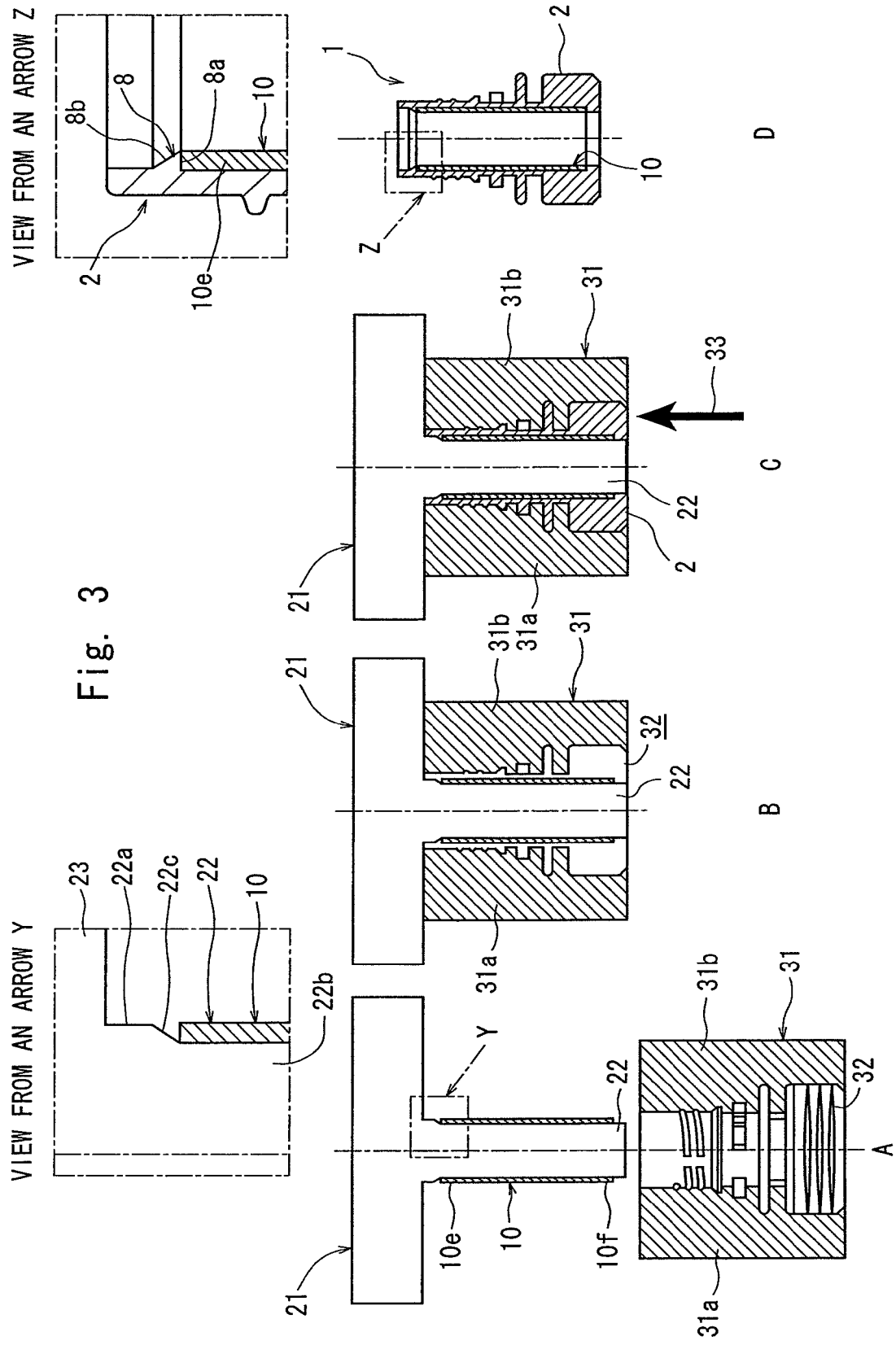

In the composite spout 1 described in the above embodiment as shown in FIG. 3 (view from an arrow Y and view from an arrow Z), the protuberance 8 shown in FIG. 1 is continuously and annularly formed on the inner peripheral wall of the conduit 3 by forming the tilted surface 22c on the core 22 of the male mold 21 extending inward in the radial direction from the large-diameter portion 22a of the core 22 to the small-diameter portion 22b thereof. The protuberance 8 may not be continuously formed but may be formed in the form of tilted surfaces and ribs maintaining a gap as described below.

Figure 4:
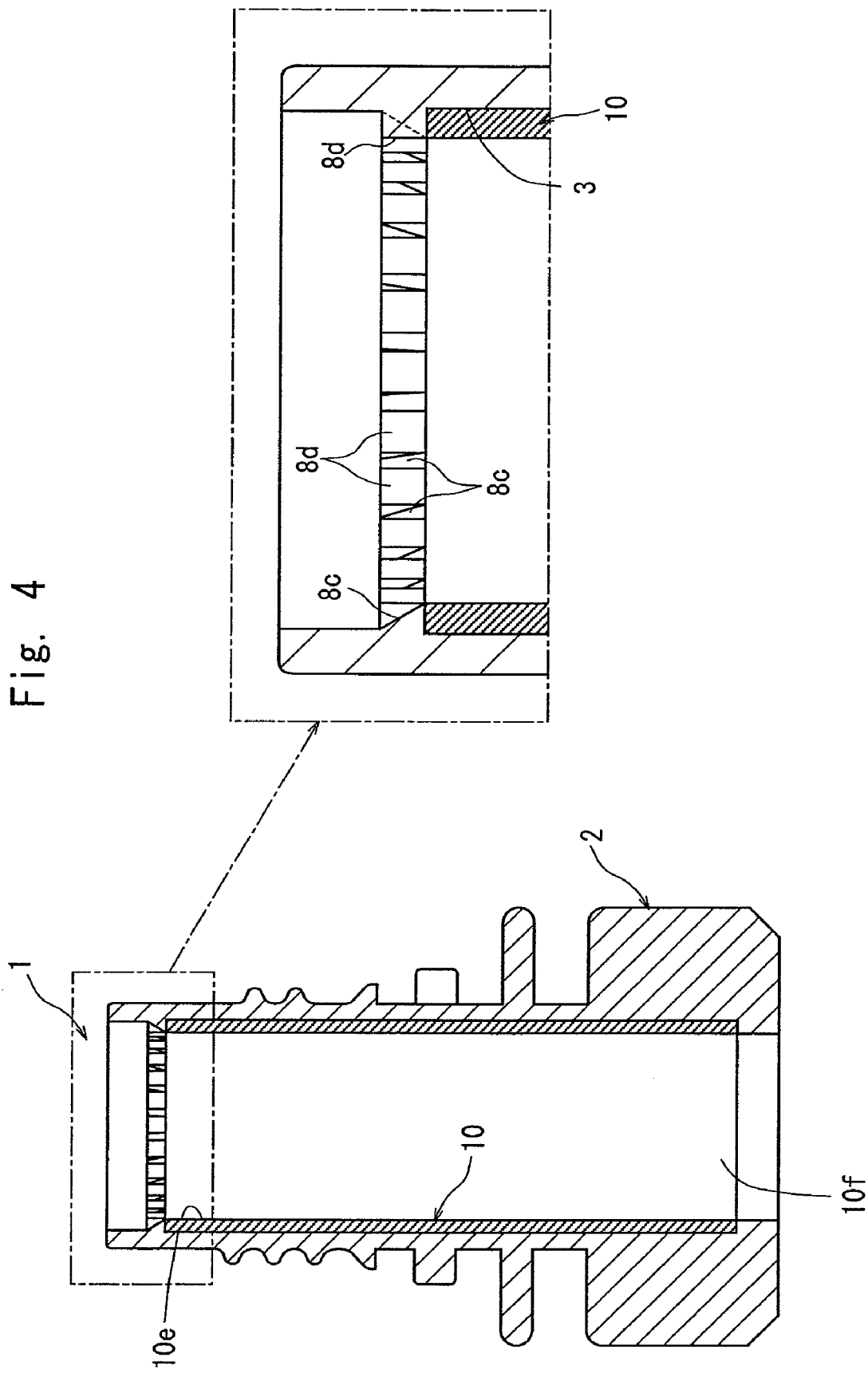
FIG. 4 is a sectional view of the composite spout according to a modified example of the embodiment.

FIG. 4 shows the composite spout 1 forming ribs. The composite spout 1 has a plurality of tilted surfaces 8c formed on the inner peripheral surface of the spout body 2 maintaining a distance in the circumferential direction. Ribs 8d are formed among the tilted surfaces 8c, 8c protruding inward in the radial direction. In conducting the forming, the shape of the core 22 only may be changed while using the sleeve 10 and the female mold 31 which are the same as those of the above embodiment.

The ribs 8d can be formed by alternately forming a portion having the tilted surface 22cc and a portion without the tilted surface 22c on the core 22 of FIG. 2 maintaining a predetermined width in the circumferential direction of the core 22. In conducting the forming, the molten resin is filled in the portions without the tilted surface to thereby form ribs 8d shown in FIG. 4. The tilted surfaces 8c and ribs 8d are covering the whole surface at the one end of the sleeve 10, and no functional resin elutes out from the functional resin layer 10a. At the time of injection-forming, the sleeve 10 is limited by the tilted surfaces 8c and ribs 8d from moving in the axial direction of the core 22.

The composite spout 1 forms the discharge port 6 of the composite spout 1 on the side of the large-diameter portion 22a which is the proximal end side of the core 22 shown in FIG. 2, and forms a pouch-mounting portion 17 (FIG. 1) on the side of the small-diameter portion 22b which is the distal end side of the core 22. As for the direction of the composite spout 1, the pouch-mounting portion 17 may be arranged on the side of the large-diameter portion 22a and the discharge port 6 may be formed on the side of the small-diameter portion 22b which is the distal end side of the core 22.

Figure 5:
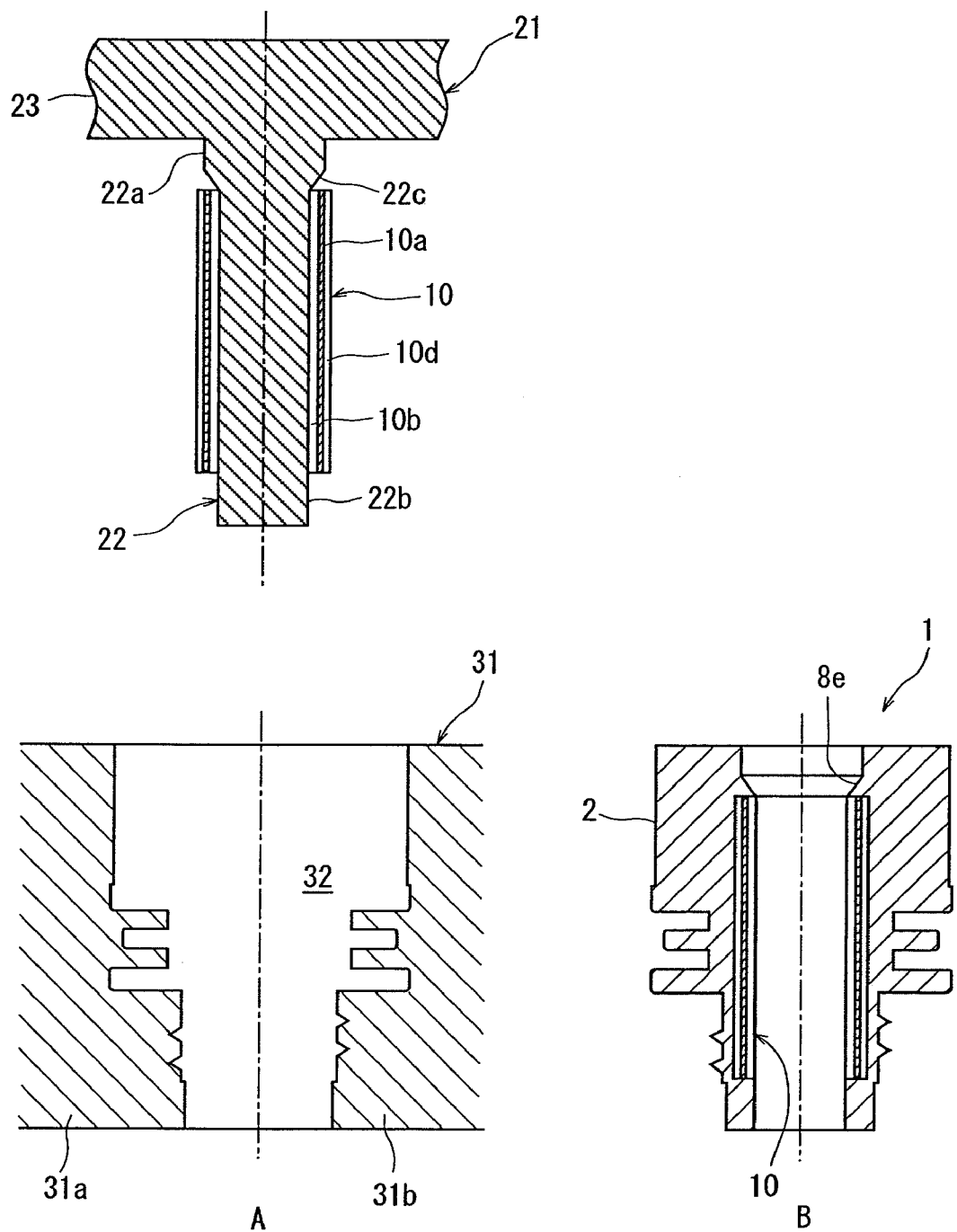

FIG. 5 shows the composite spout 1 of when the mounting portion 17 is formed on the side of the large-diameter portion 22a of the core 22. Referring to FIG. 5A, the core 22 of the male mold 21 and the sleeve 10 are the same ones as those used in the above embodiment. As for the shape of the female mold 31, the shape may be substantially reversed upside down. The difference from the above embodiment is that the composite spout 1 that is formed has the mounting portion 17 formed at the position of the tilted surface 8e (FIG. 5B) formed on the spout body 2.

In this constitution, too, the tilted surface 8e covers the whole surface at the end of the sleeve 10, and no functional resin elutes out from the functional resin layer 10a. At the time of injection-forming, the sleeve 10 is limited by the tilted surface 8e from moving in the axial direction of the core 22.

Described below with reference to the drawings are the composite spout and the apparatus for injection-forming the composite spout according to a second embodiment of the present invention.

Figure 7:
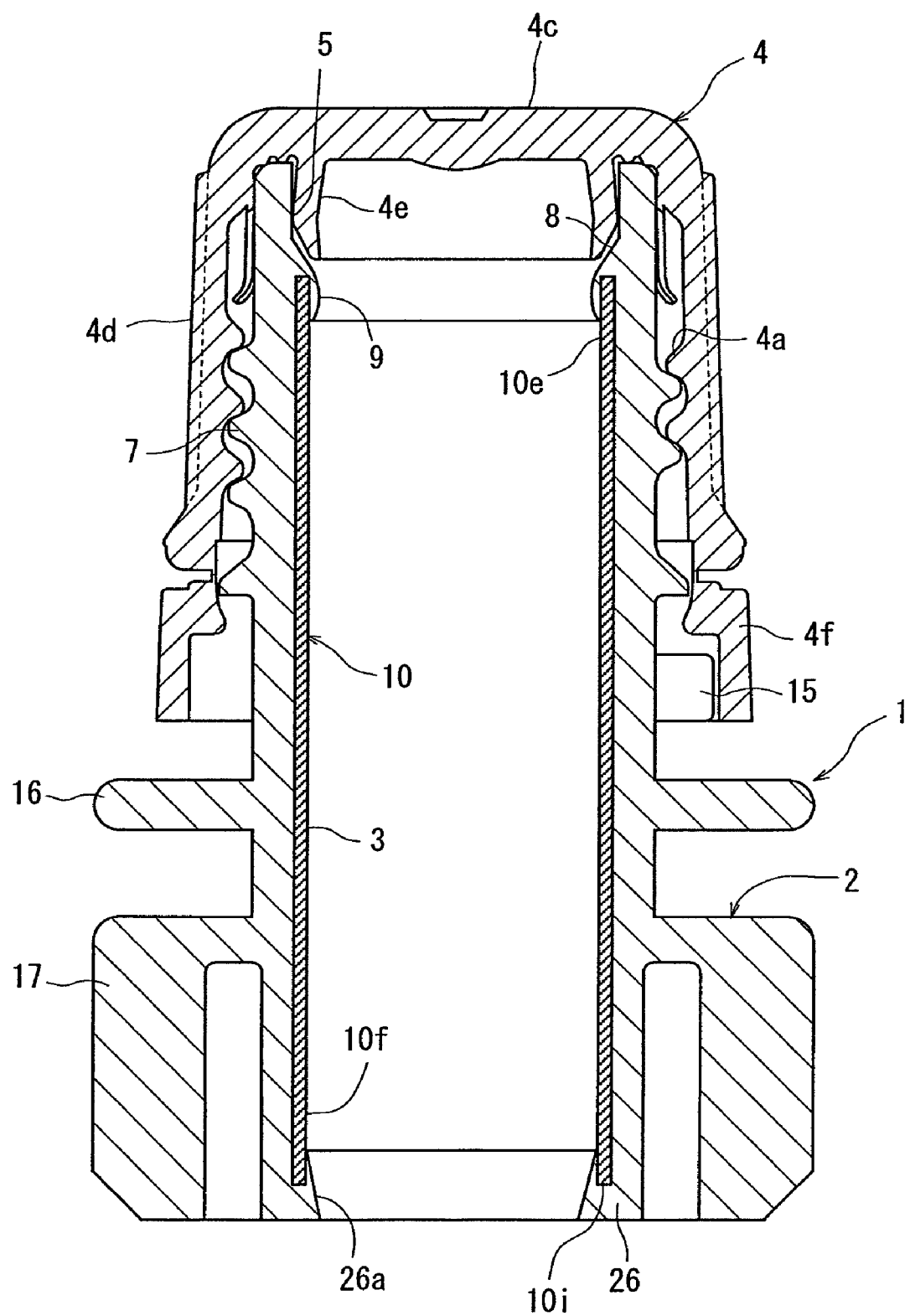
FIG. 7 is a sectional view illustrating a state where a sealing cap is fitted onto the composite spout of FIG. 6 as seen from the front.

FIG. 6 shows the composite spout 1 according to the invention, wherein FIG. 6A is a front view, FIG. 6B is a sectional view as seen from the front, FIG. 6C is a sectional view as seen from the side, and FIG. 7 is a sectional view illustrating a state where a sealing cap is fitted onto the composite spout as seen from the front.

The composite spout 1 is constituted by the spout body 2 and the sleeve 10, and forms the conduit 3 of nearly a cylindrical shape on the inner peripheral surface side thereof enabling the content to flow in and out and, further, forms the discharge port 6 in the upper end portion thereof.

An external thread 7 is nearly helically formed on the outer peripheral surface side of the spout body 2 so as to be screwed into the female thread 4a of a sealing cap 4 shown in FIG. 7 on the side of the discharge port 6. Under the male thread 7, there are formed an engaging portion 15 for engagement with an engaging portion of a tamper-evidence band 4b of the sealing cap 4 and a flange 16 maintaining a distance from the engaging portion 15. The flange 16 plays a functional role such as grip and support at the time of conveying the composite spout 1. The mounting portion 17 for mounting the pouch is formed at the lower part of the flange 16, and the mounting portion 17 positioned on the proximal end side of the spout body 2 maintains sealing in the connection portion between the pouch and the composite spout 1.

The sleeve 10 is fitted onto the inner peripheral surface of the spout body 2. The sleeve 10 has the same thickness from the one end 10e through up to the other end 10f in the axial direction, and the outer peripheral surface of the sleeve 10 is closely adhered onto the inner peripheral surface of the spout body 2. A protuberance 8 having a triangular shape in cross section and protruding toward the center of the conduit 3 is formed on the spout body 2 at the one end 10e of the sleeve 10 positioned on the side of the discharge port 6 of the spout body 2, the protuberance 8 being annularly formed in the circumferential direction of the conduit 3.

Referring to FIG. 8A, the protuberance 8 forms a limiting surface 8a that intersects the axial direction of the conduit 3 at right angles and a tilted surface (circular truncated conical surface or tapered surface) 8b facing the side of the discharge port 6, i.e., the tilted surface 8b expanding toward the side of the discharge port 6.

Referring to FIG. 8A, an additional portion 9 is formed on the inner peripheral surface at the one end 10e of the sleeve 10 continuously extending from the tilted surface 8b. The additional portion 9 is formed so as to protrude from the inner peripheral surface of the sleeve 10 inward in the radial direction of the sleeve 10, and has the same shape in cross section over the whole circumferential direction of the sleeve 10. The position where the additional portion 9 is formed is on the inner peripheral surface on the side of the one end 10e of the sleeve 10.

The end surface 10g (FIG. 8A) at the one end 10e of the sleeve 10 is covered with the conduit 3 of the spout body 2, with the protuberance 8 and with the additional portion 9, so that the functional resin layer 10a in the sleeve 10 will not be exposed in the inner space of the conduit 3.

An inner peripheral seal surface 5 is formed in an upper part of the conduit 3 on the inner peripheral surface side thereof, enabling a seal portion 4e of the sealing cap 4 to come in contact therewith. At the distal end of the spout body 2 forming the discharge port 6 of the composite spout 1, the inner peripheral seal surface 5 has a protuberance 8 interposed between the seal surface 5 and the sleeve 10 and is extending from the distal end of the spout body 2 up to short of the one end 10e of the sleeve 10.

The sealing cap 4 has the seal portion 4e formed on the inside of a top panel wall 4c of the cap maintaining a gap relative to a skirt portion 4*d*, and attains the sealing as the outer peripheral surface of the seal portion 4*e* comes in contact with the seal surface 5.

The spout body 2 is forming a covering portion 26 integrally therewith at a position of the other end 10*f* of the sleeve 10. Referring to FIG. 8B, the covering portion 26 is formed from the inner peripheral surface at the other end 10*f* of the sleeve 10 through up to an open end 27 on the side of the mounting portion 17 of the spout body 2. The covering portion 26 covers the other end 10*f* of the sleeve 10 like a bag, and its inner peripheral surface is forming a tilted surface 26*a* of a circular truncated conical shape with its diameter decreasing inward in the radial direction of the spout body 2 facing the open end 27.

Thus, sleeve 10 is fitted onto the inner peripheral surface of the inner hole of the spout body 2, so that the functional resin layer 10*a* (FIG. 16) of the sleeve 10 will not be exposed to the inner space of the conduit 3.

Next, described below is an injection-forming metal mold for forming the composite spout 1.

Figure 9:
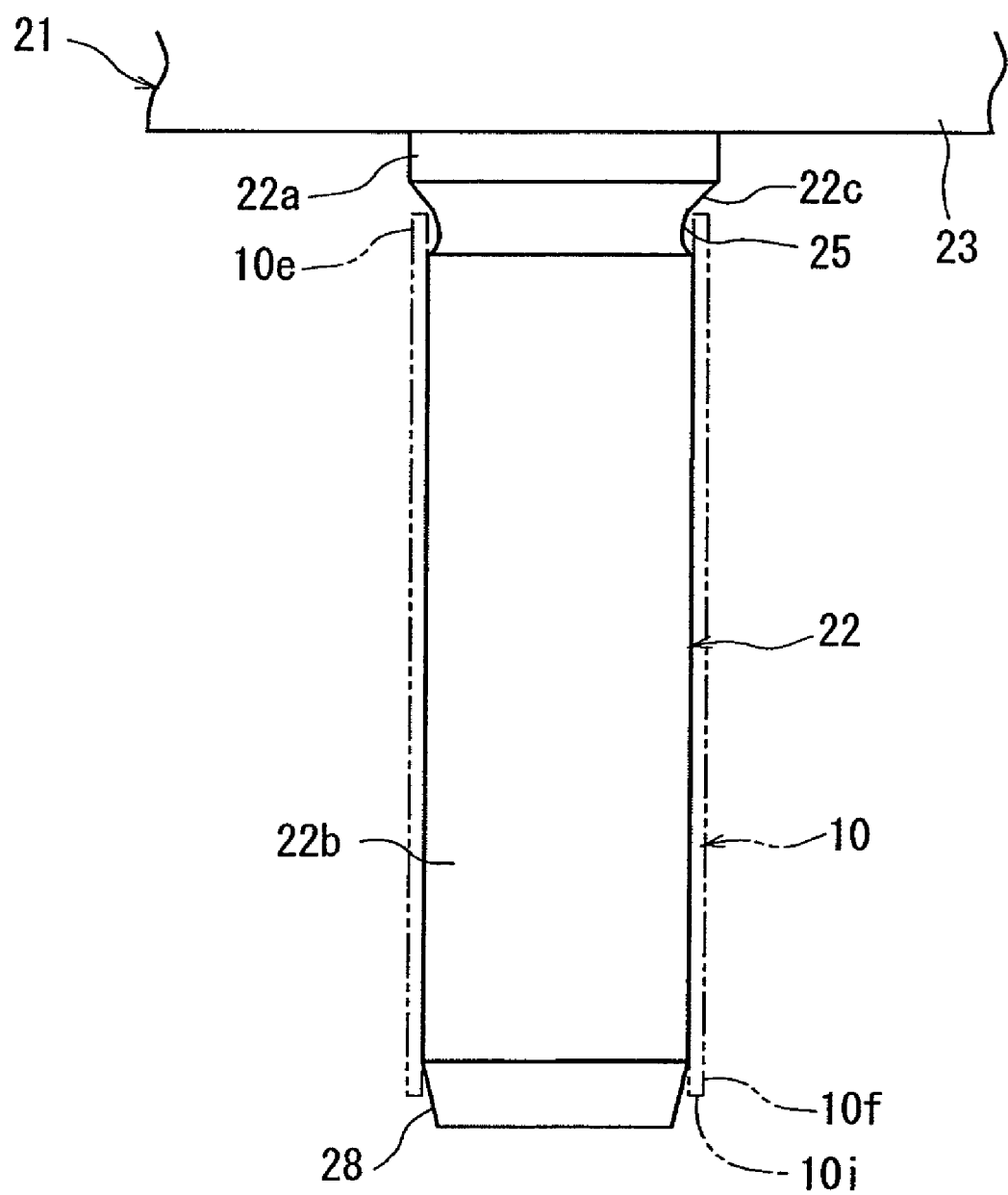
FIG. 9 is a sectional view of the male mold in the apparatus for injection-forming the composite spout of FIG. 6.

FIG. 9 shows a male mold 21 in the injection-forming metal mold. A base plate 23 of the male mold 21 is forming a core 22 of a cylindrical shape. The core 22 is constituted by a large-diameter portion 22*a* positioned at the proximal end (the core 22*a* has the distal end on the opposite side relative to the composite spout 1) on the side of the base plate 23, a small-diameter portion 22*b* positioned on the distal end side of the core 22, a titled surface 22*c* of a circular truncated conical shape formed between the large-diameter portion 22*a* and the small-diameter portion 22*b*, and an additional portion-forming recessed portion 25. The tilted surface 22*c* is so tilted as to extend inward in the radial direction facing the distal end side of the core 22.

In this embodiment, it is desired that the outer diameter of the large-diameter portion 22*a* of the core 22 is equal to the outer diameter of the sleeve 10, that the outer diameter of the small-diameter portion 22*b* is equal to the inner diameter of the sleeve 10, and that the position of the tilted surface 22*c* on the inner end side is at the position of the inner peripheral surface of the sleeve 10 or on the inside of the inner peripheral surface of the sleeve 10.

The additional portion-forming recessed portion 25 is for forming the additional portion 9 of the spout body 2 and is continuous to the tilted surface 22*c*. The additional portion-forming recessed portion 25 is constricted inward in the radial direction of the core 22 to be smaller than the inner diameter of the sleeve 10 and smaller than the outer diameter of the small-diameter portion 22*b*.

In order for the core 22 onto which the sleeve 10 is fitted to be smoothly drawn, it is desired that the additional portion-forming recessed portion 25 formed on the inner peripheral side of the sleeve 10 has the shape of a circular arc, a triangle or the like shape.

A tilted surface 28 of a circular truncated conical shape is formed at the distal end of the small-diameter portion 22*b* of the core 22. The tilted surface 28 is so formed as to be tilted inward in the radial direction facing the distal end of the core 22. Concerning the relationship to the other end 10*f* of the sleeve 10, the position of the other end 10*f* of the sleeve 10 is nearly at the center of the tilted surface 28 in the axial direction of the sleeve 10.

The length of the core 22 in the axial direction is greater than the length of the sleeve 10 in the axial direction, and the end of the tilted surface 28 is protruding beyond the other end 10*f* of the sleeve 10.

FIG. 10A illustrates a female mold 31. The female mold 31 is formed by a left female mold 31*a* and a right female mold 31*b* so as to be split toward the right and left. A cavity 32 is formed in the female mold 31, and the shape of the inner peripheral surface of the female mold 31 is the same as the outer peripheral shape of the spout body 2. Referring to FIG. 10C, the right female mold 31*b* is provided with a gate 33 which faces the cavity 32 and is communicated with the injection port of the injection-forming machine that is not shown. The male mold 21 is so constituted as to move back and forth, so that the core 22 can be inserted in the cavity 32 of the female mold 31 and pulled out therefrom in the up-and-down direction.

Next, described below are the steps of forming the composite spout 1.

The composite spout 1 is formed by using the injection-forming apparatus having the injection-forming machine and the forming metal mold. Referring to FIG. 9, the sleeve 10 is fitted onto the core 22 of the male mold 21 until the one end 10*e* of the sleeve 10 is near the boundary between the tilted surface 22*c* and the additional portion-forming recessed portion 25. In this state, a gap is formed between the tilted surface 22*c* and the one end 10*e* of the sleeve 10 so that the molten resin enters therein at the time of forming. In fitting the sleeve 10 onto the core 22, the tilted surface 28 of the circular truncated conical shape formed at the distal end of the core 22 makes it easy to fit the sleeve 10 onto the core 22, facilitating the operation for fitting the sleeve 10.

Next, with the sleeve 10 being fitted onto the core 22 as shown in FIG. 10A, the core 22 is inserted in the cavity 32 of the female mold 31, and the male mold and the female mold 21, 31 are closed together as shown in FIG. 10B.

Referring next to FIG. 10C, the resin stirred and melted in the injection-forming machine is injected into the cavity 32 through the gate 33. Since the gap has been formed between the tilted surface 22*c* and the one end 10*e* of the sleeve 10 as shown in FIG. 9, the molten resin easily flows into the additional portion-forming recessed portion 25 of the core 22. Upon receiving the dynamic pressure of the molten resin, the sleeve 10 may move toward the large-diameter portion 22*a* on the proximal end side of the core 22 but is limited by the tilted surface 22*c* of the core 22 from moving by more than a predetermined amount.

Here, the length of the sleeve 10 must be so set that the other end 10*f* of the sleeve 10 comes to a position corresponding to the tilted surface 28 on the proximal end side of the core 22 when the one end 10*e* of the sleeve 10 has moved near to the tilted surface 22*c* of the core 22.

The spout body 2 is formed as the molten resin is filled by the injection-forming machine into between the female mold 31 and the core 22 of the male mold 21. Referring to FIG. 10A, a gap of a triangular shape is formed between the one end 10*e* of the sleeve 10 and the tilted surface 22*c* formed in the core 22, and the protuberance 8 of the spout body 2 is formed as the molten resin is filled in the above gap. Referring to FIG. 8A, a portion of the protuberance 8 that comes in contact with an end surface 10*g* of the one end 10*e* of the sleeve 10, serves as a limiting surface 8*a*, while a surface of the protuberance 8 that comes in contact with the tilted surface 22*c* of the core 22 serves as a tilted surface 8*b*.

Figure 10:
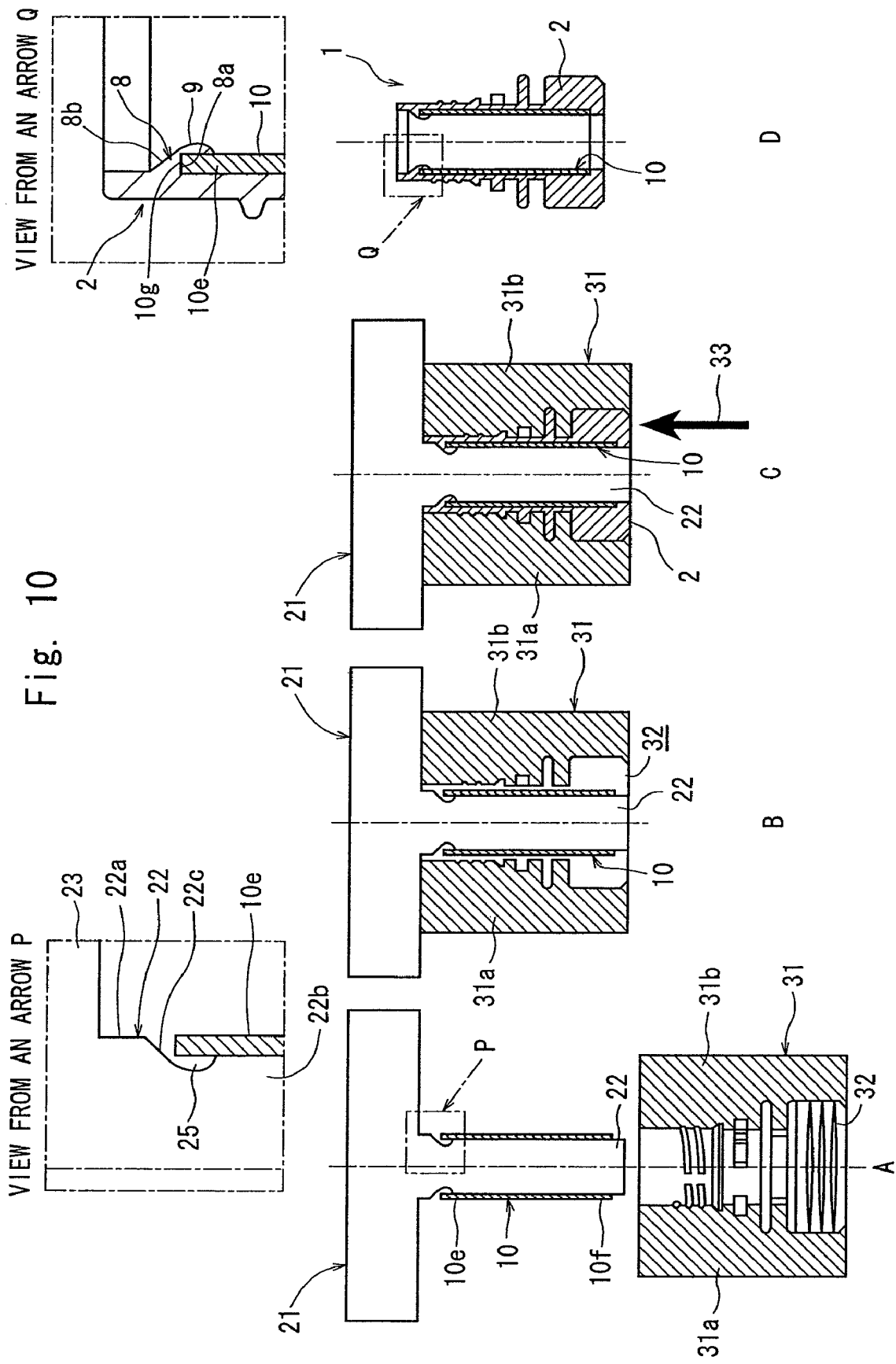

Referring to FIG. 10, further, the molten resin is filled in the additional portion-forming recessed portion 25 between the one end 10*e* of the sleeve 10 and the core 22 (view from an arrow P), the additional portion 9 is formed on the inner peripheral surface of the sleeve (view from an arrow Q), and the one end 10*e* of the sleeve 10 is covered with the additional portion 9 like a bag preventing the exfoliation of the one end 10*e* of the sleeve 10 from the spout body 2.

Here, the inner and outer surfaces of the one end 10*e* of the sleeve 10 is firmly adhered and does not exfoliate.

Referring to FIG. 8B, the molten resin is filled between the other end 10*f* of the sleeve 10 and the tilted surface 28 (FIG. 9) to thereby form a covering portion 26. Therefore, the end surface 10*i* of the other end 10*f* of the sleeve 10 is covered with the mounting portion 17 and the covering portion 26 like being covered with a bag.

At the other end 10*f* of the sleeve 10 where the mounting portion 17 is present, the spout body 2 and the outer peripheral surface of the sleeve 10 are easily melt-adhered together due to the heat accumulated in the molten resin in the mounting portion 17 or due to the injection gate 33 near to it, though, when poor melt-adhesion occurs on the other end 10*f* of the sleeve 10, the covering portion 26 is effective prevention of the exfoliation. Thus, the surfaces at the one end 10*e* and at the other end 10*f* of the sleeve 10 are reliably covered with the spout body 2.

The composite spout 1 is formed as the molten resin is cooled and solidified. After the spout body 2 is solidified, the female mold 31 is opened to take out the composite spout 1. No gap is formed between the sleeve 10 and the small-diameter portion 22*b* of the core 22. Therefore, the molten resin does not enter into the gap, and the outer peripheral surface of the sleeve 10 can be exposed to the composite spout 1.

In executing the injection forming according to this embodiment, the contact surfaces of the spout body 2 and the sleeve 10 can be melt-adhered together more reliably even on the side remote from the injection gate 33 and even if the spout body 2 has a small thickness owing to the heat possessed in sufficient amounts by the additional portion 9 that is formed.

Even if the sleeve 10 is caused to move in the axial direction of the core 22 due to the dynamic pressure of the molten resin, both end surfaces of the sleeve 10 are not exposed in the composite spout 1 after the spout body 2 has been formed. After the composite spout 1 is completed, therefore, no material such as oxygen-barrier material elutes out from the functional resin layer 10*a* in the sleeve 10.

In the foregoing was described the second embodiment of the invention forming the tilted surface 28 of a circular truncated conical shape at the distal end of the core 22 of the male mold 21. However, the tilted surface 28 may be replaced by a polygonal conical shape or a semispherical shape. In effect, the distal end of the core 22 may, at least, be smoothly formed without step to become narrow toward the end on the distal end side of the small-diameter portion 22*b*.

The composite spout 1 of FIG. 6 described in the above embodiment has the protuberance 8, additional portion 9 and covering portion 26 which are continuously and annularly formed on the inner peripheral surface of the sleeve 10. Namely, the protuberance 8, additional portion 9 and covering portion 26 are annularly and continuously formed. However, they may be discretely formed maintaining gaps instead of being continuously formed.

Next, described below is a third embodiment of the present invention. This embodiment, too, makes reference to the drawings used in the above second embodiment.

The composite spout 1 described in the above embodiment has formed the additional portion 9 on the inner peripheral surface of the sleeve 10 on the side of the one end 10*e* thereof. However, the portion for forming the additional portion 9 is not limited to be on the inner peripheral surface of the sleeve.

Figure 11:
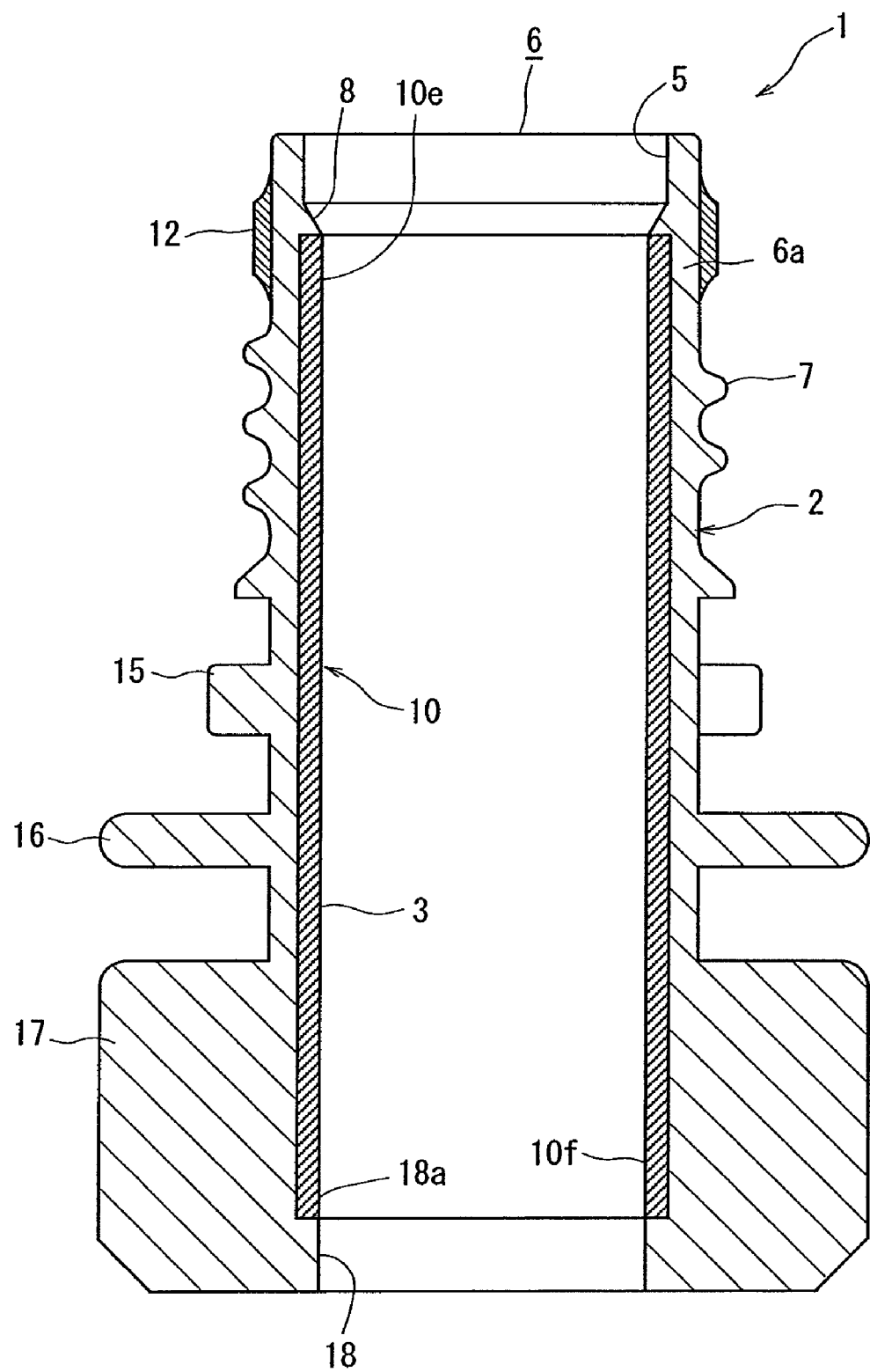
FIG. 11 is a sectional view of the composite spout according to a third embodiment of the invention.

In FIG. 11, an additional portion 12 is formed on the outer peripheral surface of a thin portion 6*a* of the spout body 2. The additional portion 12 is annularly formed on the outer peripheral surface of the spout body 2 at a portion corresponding to the one end 10*e* of the sleeve 10. The height of the additional portion 12 must not be higher than the height of the external thread 7 so will not to interfere the internal thread of the sealing cap that is not shown.

To form the additional portion 12, no additional portion-forming recessed portion 25 is formed in the core 22 of the male mold 21 that is shown in FIG. 9 and, instead, the small-diameter portion 22*b* of the core 22 is extended up to the tilted surface 22*c*. Besides, a recessed portion of the same shape as the additional portion 12 is formed in a portion of the inner peripheral wall of the female mold 31 shown in FIG. 10A corresponding to the additional portion 12.

Thus, even by forming the additional portion 12 on the outer peripheral surface of the spout body 2, the contact surfaces of the spout body 2 and of the sleeve 10 can be reliably melt-adhered together by the heat accumulated in the molten resin.

Figure 12:
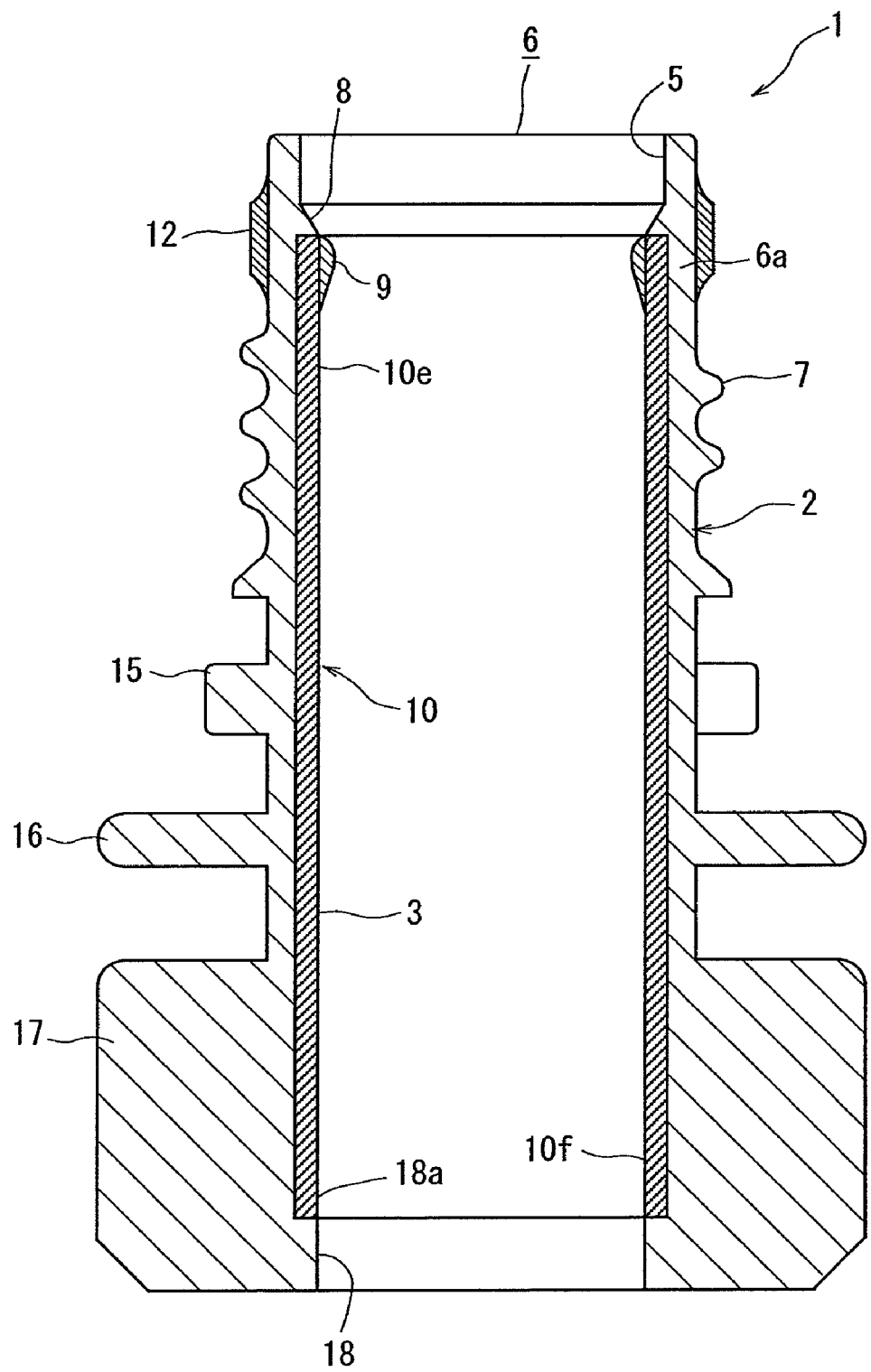
FIG. 12 is a sectional view of the composite spout according to a modified example of the third embodiment of the invention.

The composite spout shown in FIG. 12 is forming the additional portion 9 shown in FIG. 6 as well as the additional portion 12 shown in FIG. 11. By forming the additional portions 9 and 12 on the inner peripheral surface of the sleeve 10 and on the outer peripheral surface of the spout body 2 as described above, the contact surfaces of the spout body 2 and of the sleeve 10 can be reliably melt-adhered together even on the side remote from the injection gate 33. More heat can be conducted to the contact surfaces of the spout body 2 and the sleeve 10 than the cases of the composite spout 1 of FIG. 6 and the composite spout 1 of FIG. 11, and the contact surfaces can be melt-adhered more reliably.

In the case of the composite spout 1 of FIG. 6 described in the above embodiment, the additional portion 9 was continuously and annularly formed on the inner peripheral surface side of the sleeve 10. However, the additional portion 9 may not be continuously formed but may be formed being divided into a plurality of portions maintaining a gap.

Figure 13:
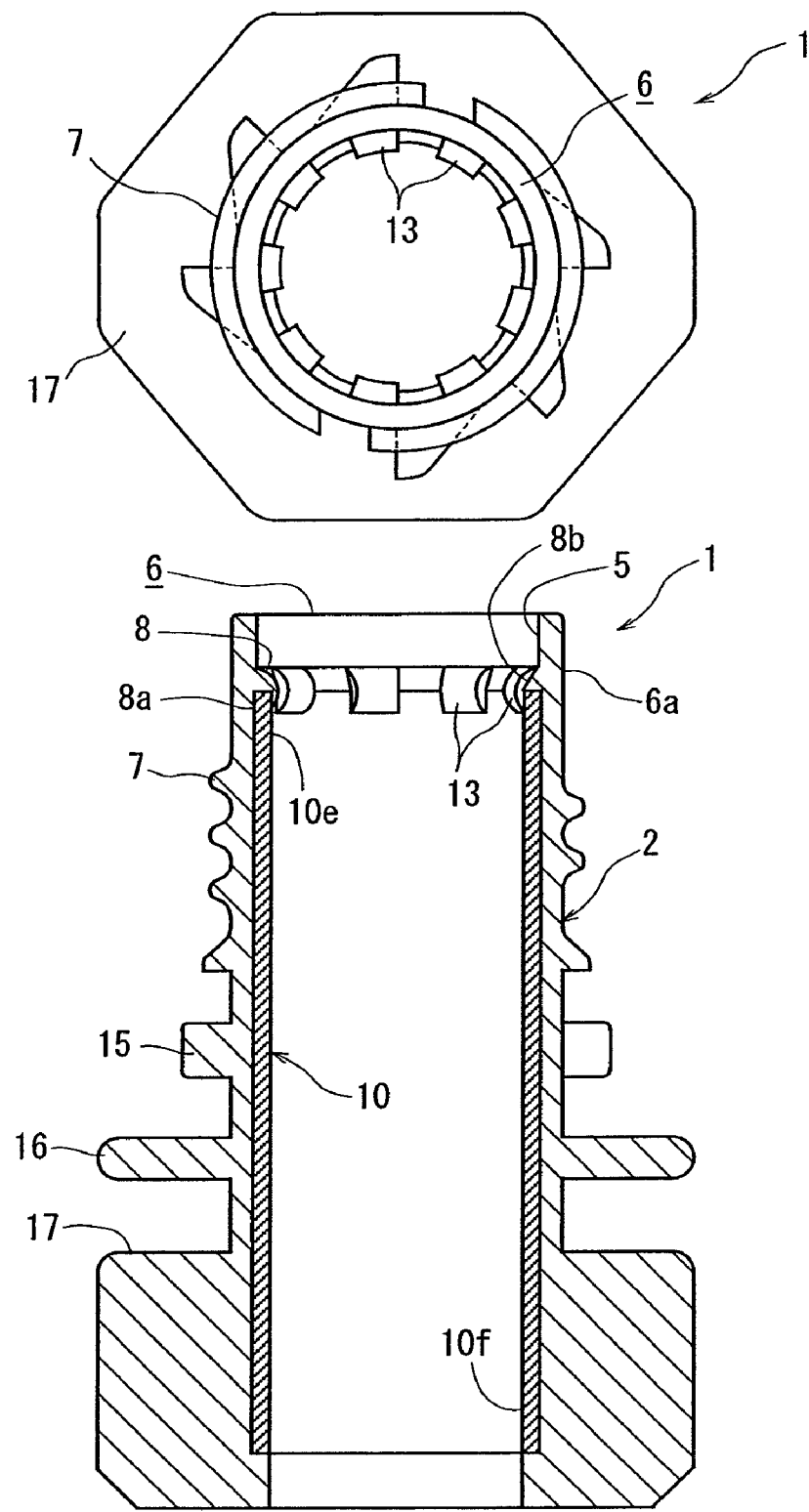
FIG. 13 is a sectional view of the composite spout according to another modified example of the third embodiment of the invention.
Figure 14:
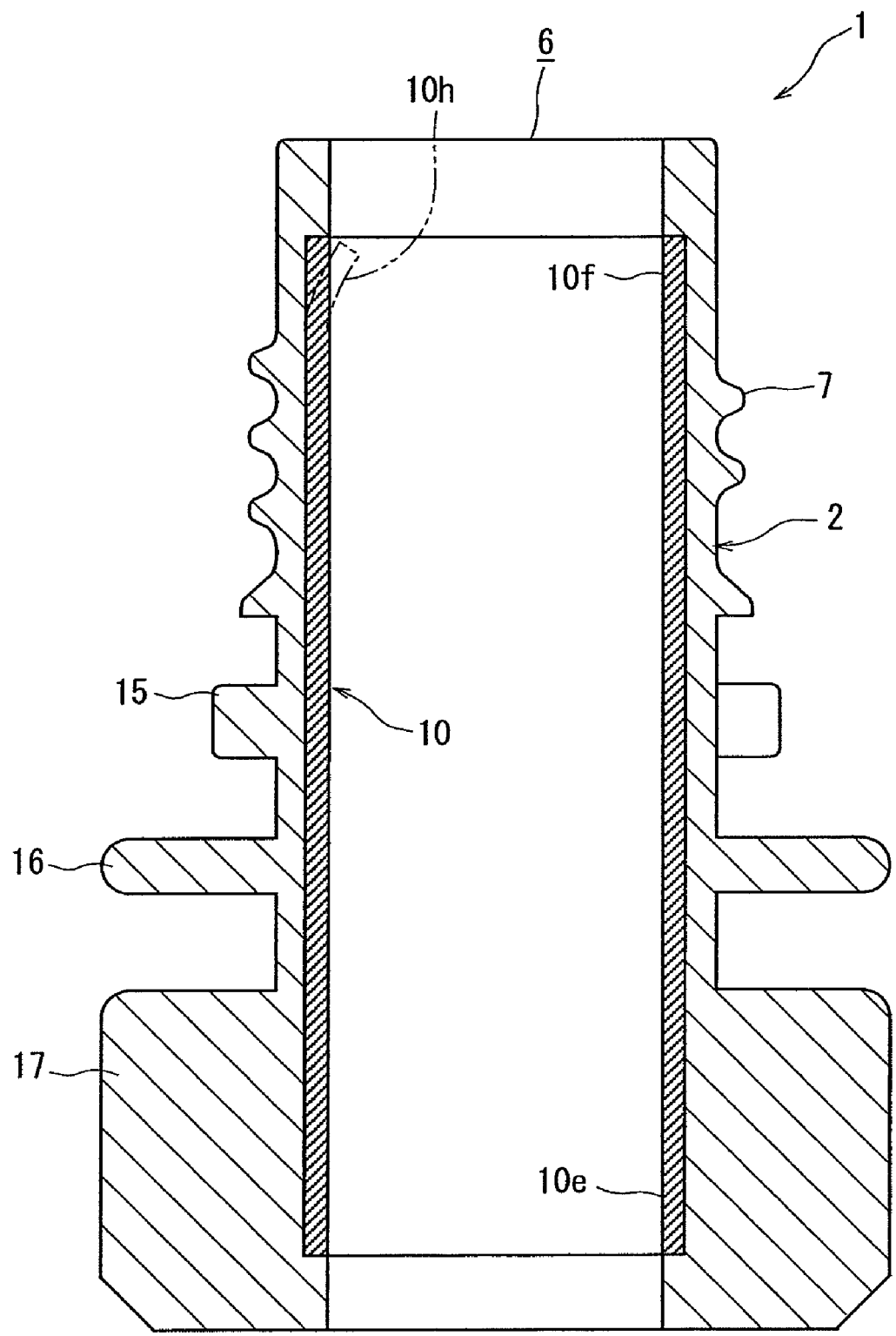
FIG. 14 is a sectional view of a conventional composite spout.
Figure 15:
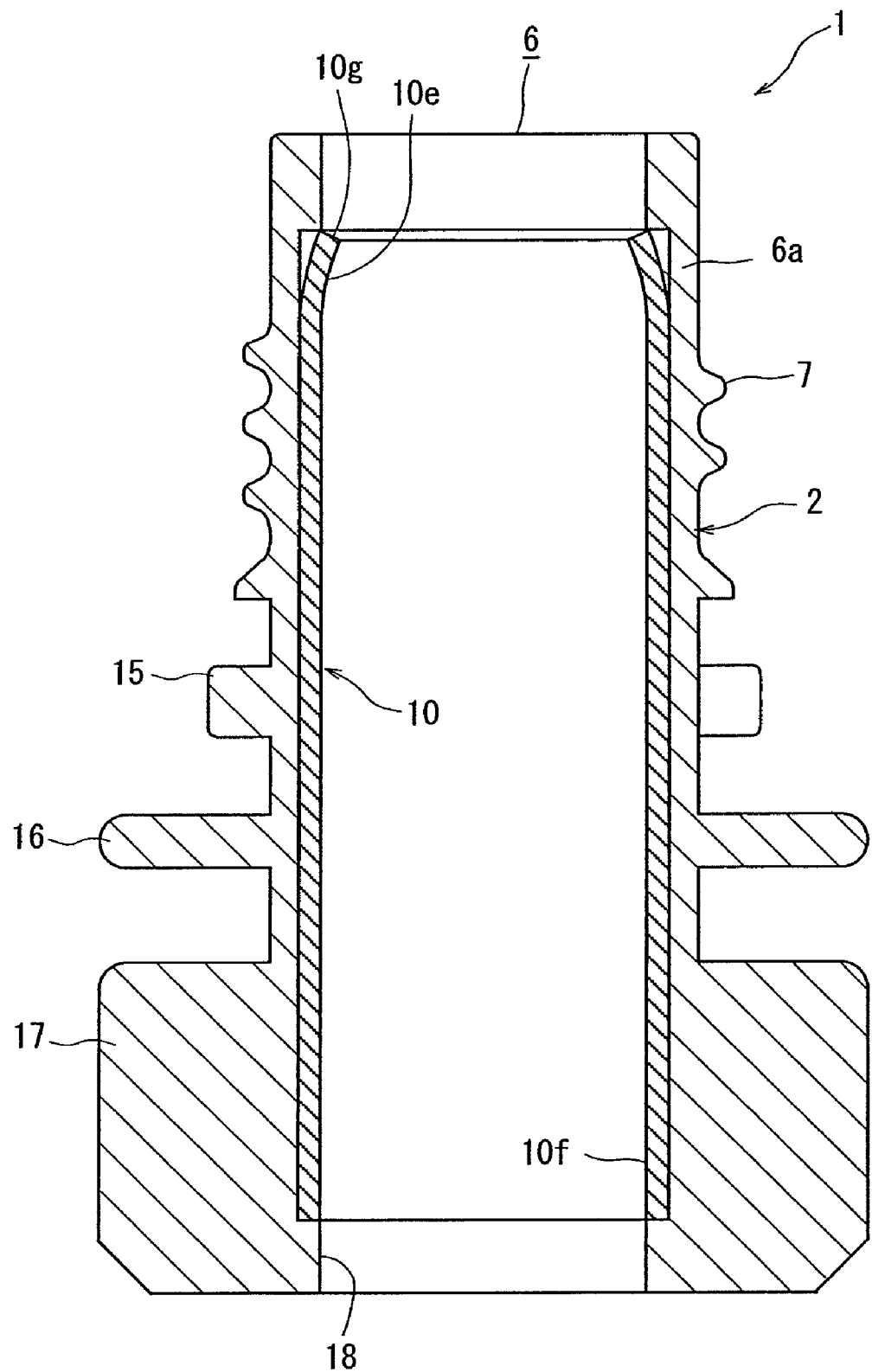
FIG. 15 is a sectional view of another conventional composite spout.

FIG. 13 shows a composite spout 1 forming such additional portions 13. As shown, the additional portions 13 are formed on the inner peripheral surface of the spout body 2 maintaining a gap in the circumferential direction protruding inward of the sleeve 10 crossing the edge on the inner peripheral side of the sleeve 10 in the axial direction of the sleeve 10. Among the additional portions 13, there are formed protuberances 8 of a triangular shape in cross section in the axial direction of the sleeve 10, the protuberances 8 forming limiting surfaces 8*a* extending in the radial direction of the sleeve 10 and tilted surfaces 8*b* facing the discharge port 6. The protuberances 8 are such that the width of the limiting surfaces 8*a* is nearly equal to the thickness of the end surface of the one end 10*e* of the sleeve 10, and the one end 10*e* of the sleeve 10 is brought into contact with the limiting surfaces 8*a*.

To form the additional portions 13, recessed portions of a shape corresponding to the additional portions 13 may be formed in the core 22 in the circumferential direction thereof maintaining a gap.

Referring to FIG. 9, the core 22 is fitted onto the sleeve 10 until it comes in contact with the tilted surface 22*c* of the core 22 that forms the tilted surface 8*b* of the protuberance 8 at the one end 10*e* of the sleeve 10. Here, the tilted surface 22*c* plays the role of positioning. The molten resin injected from the injection-forming machine enters through the portions corresponding to the additional portions 13, and the spout body 2 can be easily formed. Further, the sleeve 10 receives the dynamic pressure of the molten resin that is injected, and is urged to move toward the large-diameter portion 22*a* on the proximal end side of the core 22. However, the motion of the sleeve 10 is limited by the tilted surface 22*c* of the core 22.

Even when the additional portions are constituted as shown in FIGS. 11 to 13, the heat can be imparted due to the contact surfaces of the spout body 2 and the sleeve 10, and the contact surfaces can be melt-adhered more reliably.

The composite spout of the invention is obtained by injection-forming the spout body in a form in which the cylindrical sleeve having a functional resin layer disposed as an intermediate layer is fitted as a core onto the core member of the injection-forming metal mold such that the inner peripheral surface only of the cylindrical sleeve is substantially exposed on the inner peripheral surface of the spout, wherein a tilted surface is formed on the inner peripheral surface at one end of the spout body in at least a portion thereof in the circumferential direction, the tilted surface being tilted outward in the radial direction from a position in agreement with the inner peripheral edge at the one end of the cylindrical sleeve or from the inside thereof in the radial direction facing the one end of the spout body. This prevents the sleeve that is fitted onto the core member at the time of injection forming from moving in the axial direction of the core.

In the invention, the one end of the inner peripheral surface of the composite spout body is forming the tilted surface over the whole circumferential direction covering the whole end surface of the sleeve. Therefore, the functional resin does not elute out from the functional resin layer in the sleeve when the content is filled, reliably preventing problems related to sanitation, a drop of flavor of the content and a change in the content.

In the invention, the one end of the inner peripheral surface of the spout body is forming the tilted surfaces at a plurality of portions maintaining a distance in the circumferential direction. By forming a minimum degree of tilted surfaces, therefore, it is allowed to limit the motion of the cylindrical sleeve fitted onto the core member in the axial direction of the core member at the time of injection forming.

In the injection-forming apparatus of the invention, the core member has a tilted surface which is in agreement with the inner peripheral edge at one end of the cylindrical sleeve fitted onto the core member or is extending outward in the radial direction from the inside of the inner peripheral edge in the radial direction facing one end of a cavity for forming the spout body. This limits the motion of the sleeve fitted onto the core member in the axial direction of the core at the time of injection forming.

In the composite spout of the invention, an end of the inner peripheral surface of the spout body constituting the proximal end of the spout forms a tilted surface tilted inward in the radial direction facing an open end of the proximal end, and the one end side of the tilted surface covers the inner peripheral surface of the other end side of the cylindrical sleeve, making it possible to reliably cover both ends of the sleeve. This prevents the gas-barrier member from being deteriorated in the functional resin layer in the sleeve or from eluting out.

In the injection-forming apparatus of the invention, the distal end of the core member of the male mold is forming a titled surface that is smoothly tilted inward in the radial direction from the side of the proximal end of the core member facing the side of the distal end thereof, enabling the sleeve to be easily fitted onto the core.

In the composite spout of the invention, an additional portion is formed on at least a portion the spout body in the circumferential direction thereof to cover an end portion of the inner peripheral surface of the cylindrical sleeve on the distal end side thereof, or an additional portion protruding outward in the radial direction is formed on the outer peripheral surface of the spout body at a portion corresponding to an end portion of the cylindrical sleeve on the distal end side thereof. By forming the additional portion in the portion where the spout body and the sleeve are melt-adhered together, the heat of the molten resin is accumulated in an amount sufficient for melt-adhering them together at the time of injection forming. Therefore, the contact surfaces of the spout body and the sleeve can be reliably melt-adhered together, preventing the elution of functional resin from the functional resin layer of the sleeve when the content is filled and, further, preventing problems related to sanitation or a drop of flavor of the content.

The invention claimed is:

1. A composite spout in which a cylindrical sleeve having a functional resin layer disposed as an intermediate layer is fitted onto an inner peripheral surface of a spout body in a manner that the inner peripheral surface only of the cylindrical sleeve is substantially exposed, wherein a protuberance having a first tilted surface and a limiting surface covering one end of said cylindrical sleeve on the side of a distal end of the composite spout are formed on the inner peripheral surface at a distal end of said spout body in at least a portion thereof in the circumferential direction, the first tilted surface being tilted outward in the radial direction from a position in agreement with an inner peripheral edge at the one end of the cylindrical sleeve or from the inside thereof in the radial direction facing the distal end of the spout body.

2. The composite spout according to claim 1, wherein the distal end of said spout body constitutes a discharge end of said spout.

3. The composite spout according to claim 1, wherein the distal end of said inner peripheral surface of said spout body forms said tilted surface over the whole circumferential direction.

4. The composite spout according to claim 1, wherein the distal end of said inner peripheral surface of said spout body forms said tilted surface at a plurality of portions maintaining a distance in the circumferential direction.

5. A composite spout according to claim 1, wherein an other end of said cylindrical sleeve is disposed at a proximal end of said spout body, and an end of the inner peripheral surface of said spout body constituting the proximal end of said spout forms a second tilted surface tilted inward in the radial direction facing an open end of the proximal end, and covers other end of said cylindrical sleeve on the side of the proximal end of the composite spout.

6. The composite spout according to claim 1, wherein a sealing region of a predetermined length is formed on the inner peripheral surface of said spout body at the distal end of said spout body constituting a discharge end of said spout, said sealing region extending from the distal end of said spout body up to just short of the one end of said cylindrical sleeve.

7. The composite spout according to claim 1, wherein, at the distal end of said spout body constituting a discharge end of said spout, an additional portion is formed on the outer peripheral surface and/or on the inner peripheral surface of said spout body at a portion where said cylindrical sleeve corresponds to the distal end side of said spout body, said additional portion protruding outward and/or inward in the radial direction.

8. The composite spout according to claim 7, wherein said additional portion is present over the whole circumferential direction or is formed being divided into a plurality of portions maintaining a distance in the circumferential direction.

9. The composite spout according to claim 8, wherein said additional portion on the inner peripheral surface side of said spout body covers the inner peripheral surface of said cylindrical sleeve on the one end side thereof.

10. The composite spout according to claim 7, wherein said additional portion protruding inward in the radial direction continuously extends from said first tilted surface and covers the inner peripheral surface of said cylindrical sleeve.

* * * * *